(12) United States Patent
Liang

(10) Patent No.: US 12,074,728 B2
(45) Date of Patent: Aug. 27, 2024

(54) TUNNEL CONFIGURATION METHOD, APPARATUS, SYSTEM, AND DEVICE, AND STORAGE MEDIUM

(71) Applicant: HUAWEI TECHNOLOGIES CO., LTD., Shenzhen (CN)

(72) Inventor: Qiandeng Liang, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 314 days.

(21) Appl. No.: 17/701,882

(22) Filed: Mar. 23, 2022

(65) Prior Publication Data

US 2022/0217016 A1 Jul. 7, 2022

Related U.S. Application Data

(63) Continuation of application No. PCT/CN2020/118058, filed on Sep. 27, 2020.

(30) Foreign Application Priority Data

Sep. 27, 2019 (CN) .......................... 201910927605.8
Dec. 27, 2019 (CN) .......................... 201911382931.1

(51) Int. Cl.
*H04L 12/46* (2006.01)
*H04L 45/02* (2022.01)
*H04L 45/745* (2022.01)

(52) U.S. Cl.
CPC ...... *H04L 12/4633* (2013.01); *H04L 12/4641* (2013.01); *H04L 45/02* (2013.01); *H04L 45/745* (2013.01)

(58) Field of Classification Search
None
See application file for complete search history.

(56) References Cited

U.S. PATENT DOCUMENTS 8,804,732 B1   8/2014 Hepting et al.
2016/0337204 A1  11/2016 Dubey et al.
(Continued)

FOREIGN PATENT DOCUMENTS

CN   105490884 A   4/2016
CN   105812259 A   7/2016
(Continued)

OTHER PUBLICATIONS

3GPP TS 29.281 V15.6.0 (Sep. 2019) 3rd Generation Partnership Project; Technical Specification Group Core Network and Terminals; General Packet Radio System (GPRS) Tunnelling Protocol User Plane (GTPv1-U) (Release 15), total 32 pages.
(Continued)

*Primary Examiner* — Christine T Duong
(74) *Attorney, Agent, or Firm* — Rimon PC

(57) ABSTRACT

Embodiments of this disclosure include a method where an access point (AP) device sends, to an access point controller (AC) device, a data tunnel support capability used to indicate a type of at least one data tunnel supported by the AP device. The type of the at least one data tunnel includes a virtual extensible local area network (VXLAN). The AP device receives configuration information of a VXLAN tunnel sent by the AC device. A local device of the VXLAN tunnel is the AP device, and the configuration information of the VXLAN tunnel includes an internet protocol (IP) address of at least one peer device of the VXLAN tunnel and virtual network index (VNI) information of the VXLAN tunnel. The AP device generates tunnel encapsulation information and routing information based on the IP address of the at least one peer device of the VXLAN tunnel and the VNI information.

20 Claims, 8 Drawing Sheets

(56) References Cited

U.S. PATENT DOCUMENTS

2017/0302476 A1* 10/2017 Yang .................. H04L 12/4683
2018/0102919 A1    4/2018 Hao et al.

FOREIGN PATENT DOCUMENTS

| CN | 106304401 A | 1/2017 |
| CN | 106789748 A | 5/2017 |
| CN | 108418700 A | 8/2018 |
| CN | 109600265 A | 4/2019 |

OTHER PUBLICATIONS

C. Perkins, "IP Encapsulation within IP", Network Working Group, Request for Comment: 2003, Oct. 1996, total 14 pages.

W. Townsley et al., "Layer Two Tunneling Protocol "L2TP"", Network Working Group, Request for Comments: 2661, Aug. 1999, total 80 pages.

D. Farinacci et al., "Generic Routing Encapsulation (GRE)", Network Working Group, Request for Comments: 2784, Mar. 2000, total 9 pages.

J. Lau, Ed et al., "Layer Two Tunneling Protocol—Version 3 (L2TPv3)", Network Working Group, Request for Comments: 3931, Mar. 2005, total 94 pages.

P. Calhoun, Ed. et al., "Control and Provisioning of Wireless Access Points (CAPWAP) Protocol Binding for IEEE 802.11", Network Working Group, Request for Comments: 5416, Mar. 2009, total 76 pages.

P. Calhoun, Ed. et al., "Control and Provisioning of Wireless Access Points (CAPWAP) Protocol Specification", Network Working Group, Request for Comments: 5415, Mar. 2009, total 155 pages.

R. Wakikawa et al., "IPv4 Support for Proxy Mobile IPv6", Internet Engineering Task Force (IETF), Request for Comments: 5844, May 2010, total 49 pages.

A. Muhanna et al., "Generic Routing Encapsulation (GRE) Key Option for Proxy Mobile IPv6", Internet Engineering Task Force (IETF), Request for Comments: 5845, Jun. 2010, total 23 pages.

R. Zhang et al., "Alternate Tunnel Encapsulation for Data Frames in Control and Provisioning of Wireless Access Points (CAPWAP)", Internet Engineering Task Force (IETF), Request for Comments: 8350, Apr. 2018, total 29 pages.

A. Sajassi, Ed. et al., "A Network Virtualization Overlay Solution Using Ethernet VPN (EVPN)", Internet Engineering Task Force (IETF), Request for Comments: 8365, Mar. 2018, total 33 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| WLAN ID |    Status     |  Mode |          VLAN ID            |
+-+-+-+-+-+-+-+-+-+-+-+-+-+-+-+-+-+-+-+-+-+-+-+-+-+-+-+-+-+-+-+-+
*            Access Router Information Elements                 *
+-+-+-+-+-+-+-+-+-+-+-+-+-+-+-+-+-+-+-+-+-+-+-+-+-+-+-+-+-+-+-+-+
```

FIG. 4

TUNNEL CONFIGURATION METHOD, APPARATUS, SYSTEM, AND DEVICE, AND STORAGE MEDIUM

CROSS-REFERENCE TO RELATED APPLICATIONS

This application is a continuation of International Application No. PCT/CN2020/118058, filed on Sep. 27, 2020, which claims priority to Chinese Patent Application No. 201911382931.1, filed on Dec. 27, 2019, and Chinese Patent Application No. 201910927605.8, filed on Sep. 27, 2019. All of the aforementioned patent applications are hereby incorporated by reference in their entireties.

TECHNICAL FIELD

This application generally relates to the field of communication technologies, and in particular, to a tunnel configuration method, apparatus, system, and device, and a storage medium.

BACKGROUND

Conventional virtual extensible local area networks (VXLAN) technology have been widely applied to data centers and a large campus networks, so that the VXLAN can reach a network edge of a wireless local area network (WLAN), and so that an end-to-end virtual network of the campus network can be realized. In the VXLAN network, approaches on how to configure a tunnel is an urgent problem to be solved.

SUMMARY

Embodiments of this application provide a tunnel configuration method, apparatus, system, and device, and a storage medium, to resolve problems present in related technologies. Technical solutions are as follows:

According to a first aspect, a tunnel configuration method is provided. An access point (AP) device is used as an example. The AP device sends a data tunnel support capability of the AP device to an access point controller (AC) device. The data tunnel support capability is used to indicate a type of at least one data tunnel supported by the AP device, and the type of the at least one data tunnel includes a virtual extensible local area network (VXLAN). Then, the AP device receives configuration information of at least one VXLAN tunnel and that is sent by the AC device. A local end of the VXLAN tunnel is the AP device, and the configuration information of the VXLAN tunnel includes an internet protocol (IP) address of at least one peer device of the at least one VXLAN tunnel and virtual network index (VNI) information of the at least one VXLAN tunnel. The AP device generates tunnel encapsulation information and routing information based on the IP address of the at least one peer device of the at least one VXLAN tunnel and the VNI information.

The peer device of the at least one VXLAN tunnel may be the AC device or an AR device. For example, the routing information includes: A next hop of a default route is the peer device of the VXLAN tunnel. The tunnel encapsulation information includes an IP address of the AP, the IP address of the at least one peer device of the VXLAN tunnel, and the VNI, and may further include a parameter such as a source group ID. The VNI in the tunnel encapsulation information is obtained based on the VNI information.

According to the tunnel configuration method provided in these embodiments of this application, a wireless local area network (WLAN) can be virtualized, and a WLAN AC is supported to indicate the AP to use the VXLAN as a data tunnel, and to specify that a remote AC or AR device is used as a peer node, namely, a peer device, of the VXLAN tunnel of the AP, so that the VXLAN covers a network edge device of the WLAN.

In embodiments, after setting up the at least one VXLAN tunnel, the AP device may further detect IP network reachability of the peer device of the at least one VXLAN tunnel. When detecting that the peer device of any VXLAN tunnel is in a state in which an IP network is unreachable, or when detecting that the peer device of any VXLAN tunnel is restored from a state in which an IP network is unreachable to a state in which an IP network is reachable, the AP device sends tunnel status indication information to the AC device. The tunnel status indication information is used to indicate a tunnel status. In other words, the tunnel status indication information is used to indicate a state in which a tunnel is unreachable, or is used to indicate that the tunnel is restored to a reachable state after a failure occurs.

That at least one VXLAN tunnel in the VXLAN tunnel on which the AP device is located is a first VXLAN tunnel, and each local device of the at least one VXLAN tunnel is the AP device is used as an example. The AP device detects IP network reachability of a peer device of the first VXLAN tunnel. When detecting that the peer device of the first VXLAN tunnel is in a state in which an IP network is unreachable, the AP device sends first tunnel status indication information to the AC device, to indicate, based on the first tunnel status indication information, that the tunnel status is an unreachable state. Alternatively, when detecting that the peer device of the first VXLAN tunnel is restored from a state in which the IP network is unreachable to a state in which the IP network is reachable, the AP device sends second tunnel status indication information to the AC device, and indicates, based on the second tunnel status indication information, that the tunnel status is in a reachable state.

In embodiments, when it is detected that the peer device of the first VXLAN tunnel is in the state in which the IP network is unreachable, the method further includes: switching, based on a configured VXLAN tunnel backup relationship and a configured VXLAN tunnel backup policy to an alternate VXLAN tunnel of the at least one VXLAN tunnel corresponding to the first VXLAN tunnel, uplink traffic forwarded by a terminal through the AP device. When the peer device is in a state in which a network is unreachable, the uplink traffic is switched to the alternate VXLAN tunnel in a timely manner, to affect no service.

In embodiments, after the switching, to an alternate VXLAN tunnel of the at least one VXLAN tunnel corresponding to the first VXLAN tunnel, uplink traffic forwarded by a terminal through the AP device, the method further includes: After detecting that the peer device of the first VXLAN tunnel is restored from the state in which an IP network is unreachable to the state in which the IP network is reachable, determining, based on a configured tunnel switchback policy, whether to switch the uplink traffic back to the first VXLAN tunnel.

For example, if the tunnel switchback policy indicates to perform switchback, after the AP device detects that the peer device of the first VXLAN tunnel is restored from the state in which an IP network is unreachable to the state in which an IP network is reachable, the AP device determines, based on the configured tunnel switchback policy, to switch the uplink traffic back to the first VXLAN tunnel. Alternatively, if the tunnel switchback policy indicates not to perform switchback, after the AP device detects that the peer device of the first VXLAN tunnel is restored from the state in which an IP network is unreachable to the state in which an IP network is reachable, the AP device determines, based on the configured tunnel switchback policy, not to switch the uplink traffic back to the first VXLAN tunnel.

In embodiments, when the AP device serves as an authentication point of the terminal, the method further includes: After the terminal is authenticated or goes online, sending related information of the terminal to the AC device. The related information of the terminal is used by the AC device to generate a host routing entry of the terminal, and a next hop of the host routing entry points to the AP device through the at least one VXLAN tunnel.

In embodiments, the method further includes: The AP device receives an institute of electrical and electronics engineers (IEEE) 802.11 data packet of the terminal; converts the IEEE 802.11 data packet into an IEEE 802.3 ethernet frame, generates a route based on the tunnel encapsulation information and the VNI, and encapsulates, with a corresponding VXLAN tunnel header based on the route, an IEEE 802.3 ethernet frame to be sent to the peer device of the VXLAN tunnel, to obtain a first VXLAN packet; and forwards the first VXLAN packet to the peer device of the VXLAN tunnel.

In embodiments, the method further includes: receiving a second VXLAN packet sent by the peer device of the VXLAN tunnel; performing VXLAN decapsulation on the second VXLAN packet, to obtain the IEEE 802.3 ethernet frame obtained through decapsulation; determining forwarding information based on a VNI mapping relationship in a VXLAN header of the IEEE 802.3 ethernet frame; and modifying the IEEE 802.3 ethernet frame based on the forwarding information, and converting the modified IEEE 802.3 ethernet frame into the IEEE 802.11 data packet, and sending the IEEE 802.11 data packet to the corresponding terminal.

In embodiments, that an AP device sends a data tunnel support capability of the AP device to an AC device includes: The AP device sends an extended control and provisioning of wireless access points (CAPWAP) join request to the AC device. The CAPWAP join request carries information about the type of the at least one data tunnel supported by the AP device.

That the AP device receives configuration information that is of a VXLAN tunnel and that is sent by the AC device includes: The AP device receives a CAPWAP WLAN configuration request sent by the AC device. The CAPWAP WLAN configuration request carries the configuration information of the VXLAN tunnel.

In embodiments, the configuration information of the VXLAN tunnel further includes at least one of the VXLAN tunnel backup policy and the switchback policy, the VXLAN tunnel backup policy is used to indicate the VXLAN tunnel backup relationship, and the switchback policy is used to indicate whether to perform switchback after tunnel restoration.

In embodiments, sending of the first tunnel status indication information to the AC device includes: The AP device sends a first wireless transaction protocol (WTP) event request to the AC device. The WTP event request carries the first tunnel status indication information.

The sending of the second tunnel status indication information to the AC device includes: The AP device sends a second WTP event request to the AC device. The second WTP event request carries the second tunnel status indication information.

In embodiments, the first tunnel status indication information includes: a service mode, a VLAN identifier or WLAN ID information, an IP address of a peer device of a tunnel, and a first tunnel status field, and a value of the first tunnel status field is used to indicate that the tunnel status is an unreachable state; the second tunnel status indication information includes: a service mode, a VLAN identifier or WLAN ID information, an IP address of a peer device of a tunnel, and a second tunnel status field, and a value of the second tunnel status field is used to indicate that the tunnel status is a reachable state; and the service mode, the VLAN identifier or the WLAN ID information, and the IP address of a peer device of a tunnel are used to identify a VXLAN tunnel.

According to a second aspect, a tunnel configuration method is provided. The method includes: An AC device receives a data tunnel support capability that is of an AP device and that is sent by the access point AP device. The data tunnel support capability is used to indicate a type of at least one data tunnel supported by the AP device, and the type of the at least one data tunnel includes a virtual extensible local area network (VXLAN). The AC device sends configuration information of a VXLAN tunnel to the AP device based on the data tunnel support capability of the AP device. A local device of the VXLAN tunnel is the AP device, and the configuration information of the VXLAN tunnel includes an internet protocol (IP) address of at least one peer device of the VXLAN tunnel and virtual network index (VNI) information of the VXLAN tunnel. The AC device generates a routing table based on the IP address of the at least one peer device of the VXLAN tunnel.

In embodiments, the method further includes: receiving first tunnel status indication information sent by the AP device, where the first tunnel status indication information is used to indicate that a tunnel status is an unreachable state; or receiving second tunnel status indication information sent by the AP device, where the second tunnel status indication information is used to indicate that a tunnel status is a reachable state.

In embodiments, the method further includes: receiving related information that is of a terminal and that is sent by the AP device when the AP device serves as an authentication point of the terminal; and generating a host routing entry of the terminal based on the related information of the terminal, where a next hop of the host routing entry points to the AP device through the VXLAN tunnel.

In embodiments, after the generating a host routing entry of the terminal based on the related information of the terminal, the method further includes: deleting the host routing entry of the terminal after the terminal goes offline; or updating the host routing entry of the terminal after the terminal roams to another AP device.

In embodiments, after the generating a host routing entry of the terminal based on the related information of the terminal, the method further includes: disseminating layer 2/3 (L2/3) routing information of the terminal to a corresponding access router (AR) device, where the L2/3 routing information of the terminal carries VXLAN tunnel information.

In the method provided in these embodiments of this application, a manner of deploying a gateway in a VXLAN in a distributed or centralized manner is supported, and routing information or forwarding table information can be disseminated without a need to use a protocol with a programming language such as a LISP, to simplify an implementation of the AP, and reduce consumption of L2/3 routing or forwarding table resources of the AP device.

In embodiments, the method further includes: receiving a first VXLAN packet sent by the AP device, and performing VXLAN decapsulation on the first VXLAN packet, to obtain an IEEE 802.3 ethernet frame obtained through decapsulation; determining forwarding information based on a VNI mapping relationship in a VXLAN header of the IEEE 802.3 ethernet frame; and modifying the IEEE 802.3 ethernet frame based on the forwarding information, and sending the modified IEEE 802.3 ethernet frame to an uplink routing device, or re-encapsulating the IEEE 802.3 ethernet frame with a VXLAN tunnel header and sending the re-encapsulated IEEE 802.3 ethernet frame to an AP device in which a destination terminal is located.

In embodiments, the method further includes: receiving a downlink packet of a terminal, and searching for a host routing table of the terminal; encapsulating the downlink packet with the VXLAN tunnel header based on found routing table information, to obtain a second VXLAN packet; and sending the second VXLAN packet to an AP device in which a destination terminal is located.

In embodiments, that an AC device receives a data tunnel support capability that is of an AP device and that is sent by the AP device includes: receiving, by the AC device, an extended CAPWAP join request sent by the AP device, where the CAPWAP join request carries information about a type of at least one data tunnel supported by the AP device.

That the AC device sends configuration information of a VXLAN tunnel to the AP device based on the data tunnel support capability of the AP device includes: The AC device sends a CAPWAP WLAN configuration request to the AP device based on the data tunnel support capability of the AP device. The CAPWAP WLAN configuration request carries the configuration information of the VXLAN tunnel.

In embodiments, the configuration information of the VXLAN tunnel further includes at least one of the VXLAN tunnel backup policy and the switchback policy, the VXLAN tunnel backup policy is used to indicate the VXLAN tunnel backup relationship, and the switchback policy is used to indicate whether to perform switchback after tunnel restoration.

In embodiments, the receiving first tunnel status indication information sent by the AP device includes: receiving a first WTP event request sent by the AP device. The first WTP event request carries the first tunnel status indication information.

The receiving second tunnel status indication information sent by the AP device includes: receiving a second WTP event request sent by the AP device. The second WTP event request carries the second tunnel status indication information.

According to a third aspect, a tunnel configuration apparatus is provided. The apparatus is used in an AP device and includes: a sending module, configured to send a data tunnel support capability of the AP device to an AC device, where the data tunnel support capability is used to indicate a type of at least one data tunnel supported by the AP device, and the type of the at least one data tunnel includes a VXLAN; a receiving module, configured to receive configuration information that is of a VXLAN tunnel and that is sent by the AC device, where a local device of the VXLAN tunnel is the AP device, and the configuration information of the VXLAN tunnel includes an IP address of at least one peer device of the VXLAN tunnel and VNI information of the VXLAN tunnel; and a processing module, configured to generate tunnel encapsulation information and routing information based on the IP address of the at least one peer device of the VXLAN tunnel and the VNI information, where the tunnel encapsulation information includes an IP address of the AP device, the IP address of the at least one peer device of the VXLAN tunnel, and a VNI.

In embodiments, the apparatus further includes: a detection module, configured to detect IP network reachability of a peer device of a first VXLAN tunnel, where the first VXLAN tunnel belongs to at least one VXLAN tunnel, each local device of the at least one VXLAN tunnel is the AP device, and a peer device of the at least one VXLAN tunnel is respectively the at least one peer device, where the sending module is further configured to: send first tunnel status indication information to the AC device when it is detected that the peer device of the first VXLAN tunnel is in a state in which an IP network is unreachable, where the first tunnel status indication information is used to indicate that a tunnel status is an unreachable state; or send second tunnel status indication information to the AC device when it is detected that the peer device of the first VXLAN tunnel is restored from a state in which an IP network is unreachable to a state in which an IP network is reachable, where the second tunnel status indication information is used to indicate that the tunnel status is a reachable state.

In embodiments, the processing module is further configured to switch, based on a configured VXLAN tunnel backup relationship and a configured VXLAN tunnel backup policy to an alternate VXLAN tunnel corresponding to the first VXLAN tunnel, uplink traffic forwarded by a terminal through the AP device.

In embodiments, the processing module is further configured to: after it is detected that the peer device of the first VXLAN tunnel is restored from the state in which an IP network is unreachable to the state in which an IP network is reachable, determine, based on a configured tunnel switchback policy, whether to switch the uplink traffic back to the first VXLAN tunnel.

In embodiments, the sending module is further configured to: when the AP device serves as an authentication point of the terminal, after the terminal is authenticated or goes online, send related information of the terminal to the AC device. The related information of the terminal is used by the AC device to generate a host routing entry of the terminal, and a next hop of the host routing entry points to the AP device through the VXLAN tunnel.

In embodiments, the sending module is configured to send an extended CAPWAP join request to the AC device. The CAPWAP join request carries information about the type of the at least one data tunnel supported by the AP device.

The receiving module is configured to receive a CAPWAP WLAN configuration request sent by the AC device. The CAPWAP WLAN configuration request carries the configuration information of the VXLAN tunnel.

In embodiments, the configuration information of the VXLAN tunnel further includes at least one of the VXLAN tunnel backup policy and the switchback policy, the VXLAN tunnel backup policy is used to indicate the VXLAN tunnel backup relationship, and the switchback policy is used to indicate whether to perform switchback after tunnel restoration.

In embodiments, the sending module is configured to send a first WTP event request to the AC device. The first WTP event request carries the first tunnel status indication information.

The sending module is configured to send a second WTP event request to the AC device. The second WTP event request carries the second tunnel status indication information.

In embodiments, the first tunnel status indication information includes: a service mode, a VLAN identifier or WLAN ID information, an IP address of a peer device of a tunnel, and a first tunnel status field, and a value of the first tunnel status field is used to indicate that the tunnel status is an unreachable state;

the second tunnel status indication information includes: a service mode, a VLAN identifier or WLAN ID information, an IP address of a peer device of a tunnel, and a second tunnel status field, and a value of the second tunnel status field is used to indicate that the tunnel status is a reachable state; and the service mode, the VLAN identifier or the WLAN ID information, and the IP address of a peer device of a tunnel are used to identify a VXLAN tunnel.

According to a fourth aspect, a tunnel configuration apparatus is provided. The apparatus is used in an AC device, and the apparatus includes: a receiving module, configured to receive a data tunnel support capability that is of an AP device and that is sent by the AP device. The data tunnel support capability is used to indicate a type of at least one data tunnel supported by the AP device, and the type of the at least one data tunnel includes a VXLAN; a sending module, configured to send configuration information of a VXLAN tunnel to the AP device based on the data tunnel support capability of the AP device, where the configuration information of the VXLAN tunnel includes an IP address of at least one peer device of the VXLAN tunnel and VNI information of the VXLAN tunnel; and a processing module, configured to generate a routing table based on the IP address of the at least one peer device of the VXLAN tunnel.

In embodiments, the receiving module is further configured to: receive first tunnel status indication information sent by the AP device, where the first tunnel status indication information is used to indicate that a tunnel status is an unreachable state; or receive second tunnel status indication information sent by the AP device, where the second tunnel status indication information is used to indicate that a tunnel status is a reachable state.

In embodiments, the receiving module is further configured to receive related information that is of a terminal and that is sent by the AP device when the AP device serves as an authentication point of the terminal; and the processing module is further configured to generate a host routing entry of the terminal based on the related information of the terminal, where a next hop of the host routing entry points to the AP device through the VXLAN tunnel.

In embodiments, the processing module is further configured to: delete the host routing entry of the terminal after the terminal goes offline; or update the host routing entry of the terminal after the terminal roams to another AP device.

In embodiments, the sending module is further configured to disseminate L2/3 routing information of the terminal to a corresponding AR device. The L2/3 routing information of the terminal carries VXLAN tunnel information.

In embodiments, the receiving module is configured to receive an extended CAPWAP join request sent by the AP device, where the CAPWAP join request carries information about a type of at least one data tunnel supported by the AP device; and the sending module is configured to send a CAPWAP WLAN configuration request to the AP device based on the data tunnel support capability of the AP device, where the CAPWAP WLAN configuration request carries the configuration information of the VXLAN tunnel.

In embodiments, the configuration information of the VXLAN tunnel further includes at least one of a VXLAN tunnel backup policy or a switchback policy, the VXLAN tunnel backup policy is used to indicate a VXLAN tunnel backup relationship, and the switchback policy is used to indicate whether to perform switchback after tunnel restoration.

In embodiments, the receiving module is configured to receive a WTP event request sent by the AP device, where the first WTP event request carries the first tunnel status indication information; and the receiving module is configured to receive a second WTP event request sent by the AP device, where the second WTP event request carries the second tunnel status indication information.

In embodiments, the first tunnel status indication information includes: a service mode, a VLAN identifier or WLAN ID information, an IP address of a peer device of a tunnel, and a first tunnel status field, and a value of the first tunnel status field is used to indicate that the tunnel status is an unreachable state; the second tunnel status indication information includes: a service mode, a VLAN identifier or WLAN ID information, an IP address of a peer device of a tunnel, and a second tunnel status field, and a value of the second tunnel status field is used to indicate that the tunnel status is a reachable state; and the service mode, the VLAN identifier or the WLAN ID information, and the IP address of a peer device of a tunnel are used to identify a VXLAN tunnel.

In embodiments, the VNI information described in the foregoing aspects includes the VNI or a VNI mapping relationship, the VNI mapping relationship is used to obtain the VNI, and the VNI mapping relationship includes at least one of a mapping relationship between a service set identifier (SSID) and the VNI, a mapping relationship between a VLAN and the VNI, or a mapping relationship between a VLAN pool and the VNI.

According to a fifth aspect, a tunnel configuration system is provided. The system includes an AP device, an AC device, and an AR device.

The AR device and the AC device are a combined device, or the AR device and the AC device are independent and separated devices.

The AP is configured to perform the method according to any one of the first aspect and the example embodiments of the first aspect, and the AC is configured to perform the method according to any one of the second aspect and the example embodiments of the second aspect.

According to a sixth aspect, a tunnel configuration device is provided. The device includes a memory and a processor, the memory stores at least one instruction, and the at least one instruction is loaded and executed by the processor, to implement any one of the foregoing tunnel configuration methods.

According to a seventh aspect, a computer-readable storage medium is provided. The storage medium stores at least one instruction, and a processor loads and executes the instruction to implement any one of the foregoing tunnel configuration methods.

According to an eighth aspect, a communication apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive and send a signal. In addition, when the processor executes the instructions stored in the memory, the processor is enabled to perform the method in any one of the foregoing possible implementations.

In embodiments, there are one or more processors, and there are one or more memories.

In embodiments, the memory may be integrated with the processor, or the memory and the processor are disposed separately.

In an embodiment, the memory may be a non-transitory memory, for example, a read-only memory (ROM). The memory and the processor may be integrated into one chip, or may be disposed in different chips. A type of the memory and a manner of disposing the memory and the processor are not limited in these embodiments of this application.

A computer program (product) is provided. The computer program includes computer program code. When the computer program code is run (e.g., be executed) on a computer, the computer is enabled to perform the methods in the foregoing aspects.

A chip is provided. The chip includes a processor, configured to invoke and run instructions stored in a memory, so that a communication device on which the chip is installed performs the methods in the foregoing aspects.

Another chip is provided, and includes an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

BRIEF DESCRIPTION OF DRAWINGS

FIG. 4 is a schematic diagram of a format of an alternate tunnel failure indication message according to an embodiment of this application;

DESCRIPTION OF EMBODIMENTS

A virtual extensible local area network (VXLAN) technology is a tunneling technology in which a layer 2 ethernet tunnel can be set up based on a layer 3 network, to implement cross-region layer 2 interconnection. Currently, VXLAN technology has been widely applied to data centers and large campus networks, so that a VXLAN may reach a network edge of a wireless local area network (WLAN), so that an end-to-end virtual network of the campus network is implemented. To virtualize the WLAN network, an embodiment of this application provides a tunnel configuration method. In this method, a request for comments (RFC) 8350 is extended, so that an access point (AP) may support a capability negotiation, configuration, and status sending mechanism of the VXLAN. This configuration allows for an implementation of configuring a setup of a VXLAN tunnel and negotiation of an L2/3 route between two devices: a thin AP device and an access router (AR) device.

Figure 1:
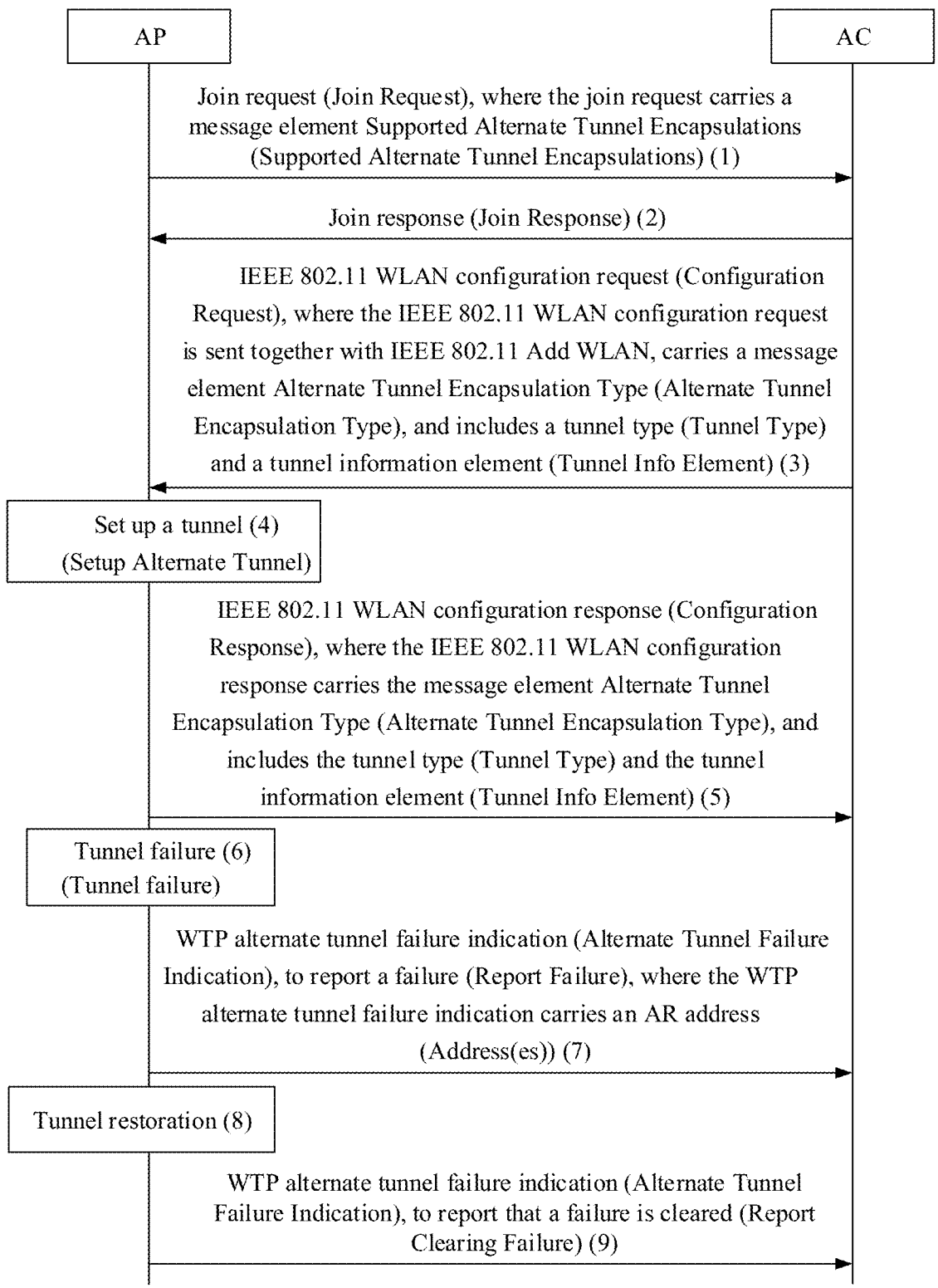
FIG. 1 is a schematic diagram of a capability negotiation, configuration, and status sending process of a virtual extensible local area network (VXLAN) supported by an access point (AP) according to an embodiment of this application.

This configuration of the VXLAN tunnel is configured based on an extended control and provisioning of wireless access points ( ) protocol and is used as an example. As shown in FIG. 1, the CAPWAP protocol is extended in the following processes:

(1) The AP device requests the AC device to join and to manage the AP device, and sends a CAPWAP join request to the AC device, the AP device sends a data tunnel support capability of the AP device by using the CAPWAP join request (e.g., JoinRequest, Join Request) to carry the data tunnel support capability. For example, the CAPWAP join request carries information about a type of at least one data tunnel supported by the AP, and the type of the at least one data tunnel includes a VXLAN.

For example, the CAPWAP join request carries a message element Supported Alternate Tunnel Encapsulations, and a list of the type of the data tunnel supported by the AP device is sent based on the message element Supported Alternate Tunnel Encapsulations. The list of the type of the data tunnel includes the type of the at least one data tunnel supported by the AP device, and the type of the at least one data tunnel includes a VXLAN tunnel.

It should be noted that the message element Supported Alternate Tunnel Encapsulations is a message element used when an alternate tunnel is set up in RFC 8350. In these embodiments of this application, the message element is extended, so that the message element can be used to carry the list of the type of the data tunnel supported by the AP device. In other words. "Supported Alternate Tunnel Encapsulations" herein is a name of the message element, and does not mean that the VXLAN tunnel set up in these embodiments of this application is exclusively an alternate tunnel. In addition to sending the list of the type of the data tunnel supported by the AP device, based on the message element Supported Alternate Tunnel Encapsulations, the AP device may send, to the AC device in another manner, the type of the data tunnel supported by the AP device.

(2) The AC device may return a join response to the AP device, to notify the AP device whether the AC device has been successfully joined, and may further notify, based on the join response, the AP device of a specific tunnel that is selected by the AC device.

(3) After discovering, based on the join request, that the AP device supports the VXLAN tunnel, the AC device sends a CAPWAP WLAN configuration request to the AP device. The CAPWAP WLAN configuration request carries configuration information of the VXLAN tunnel.

For example, the configuration information of the VXLAN tunnel includes an IP address of at least one peer device of the VXLAN tunnel and virtual network index (VNI) information of the VXLAN tunnel. The IP address of the at least one peer device of the VXLAN tunnel and the VNI information of the VXLAN tunnel may be carried in one message element for sending, or may be carried in different message elements for sending. The VNI information includes, but is not limited to, a VNI or a VNI mapping relationship, and the VNI mapping relationship may be used to determine the VNI. The VNI mapping relationship includes, but is not limited to, at least one of a mapping relationship between a service set identifier (SSID) and a VNI, a mapping relationship between a VLAN and the VNI, and a mapping relationship between a VLAN pool or the VNI.

For example, the AC device sends the CAPWAP WLAN configuration request to the AP device. The CAPWAP WLAN configuration request carries a message element Alternate Tunnel Encapsulations Type, so that the AP device configures configuration information of a VXLAN tunnel of the AP device based on the message element Alternate Tunnel Encapsulations Type. The message element Alternate Tunnel Encapsulations Type is a message element used when the alternate tunnel is set up in RFC 8350, and is used as an example used to configure the configuration information of the VXLAN tunnel of the AP device in these embodiments of this application. In addition to using the message element Alternate Tunnel Encapsulations Type, the configuration information of the VXLAN tunnel of the AP device may be configured in another manner. A manner in which the AC device sends the configuration information of the VXLAN tunnel to the AP device is not limited in these embodiments of this application.

In embodiments, the configuration information of the VXLAN tunnel may alternatively be carried in the CAPWAP WLAN configuration request together with another message element (for example, a message element Add-WLAN) to be sent, so that a plurality of message elements are sent by using one CAPWAP WLAN configuration request to carry the plurality of message elements. In this way, there is improved configuration efficiency. Optionally, the configuration information of the VXLAN tunnel and another message element may alternatively be separately sent. This is not limited in these embodiments of this application.

(4) After receiving the WLAN configuration request, the AP device sets up, based on the configuration information that is of the VXLAN tunnel and that is carried in the WLAN configuration request, a tunnel connecting the AP and the AR. In other words, the AP device sets up the VXLAN tunnel.

For example, the AC device in these embodiments of this application may have an AR function. In these embodiments, for the AP device, a local device of the VXLAN tunnel is the AP device, and a peer device of the VXLAN tunnel may be the AC device. An IP address of the peer device of the VXLAN tunnel is an IP address of the AC device. When the AP device sets up a VXLAN tunnel between the AP device and the AR device, one end of the VXLAN tunnel is the AP device, and the other end is the AC device.

Optionally, the AC device and the AR device may alternatively be two independent devices. In this case, for the AP device, a local device of the VXLAN tunnel is the AP device, and a peer device of the VXLAN tunnel may be the AR device. An IP address of the peer device of the VXLAN tunnel is an IP address of the AR device. When the AC device controls the AP device to configure the VXLAN tunnel, one end of the VXLAN tunnel is the AP device, and the other end is the AR device.

(5) The AP device may further send a WLAN configuration response to the AC device through an existing CAPWAP control tunnel between the AP device and the AC device, to notify, based on the WLAN configuration response, the AC device of whether the AP device successfully performs tunnel configuration based on the configuration information of the VXLAN tunnel.

In an example embodiment, the WLAN configuration response may carry only a configuration result. Optionally, the WLAN configuration response may further carry a message element Alternate Tunnel Encapsulations Type. The message element Alternate Tunnel Encapsulations Type carries the configuration information of the VXLAN tunnel of the AP device. The configuration information of the VXLAN tunnel may be the same as the configuration information that is of the VXLAN tunnel and is carried in the WLAN configuration request delivered by the AC device, so that the AC device determines, based on the same configuration information, that the configuration response and the configuration request are for a same VXLAN tunnel.

It should be noted that the message element is a message element Alternate Tunnel Encapsulations Type used when an alternate tunnel is set up in RFC 8350. The message element is extended in these embodiments of this application, so that the message can be used to carry the configuration information of the VXLAN tunnel of the AP device.

(6) The AP device detects IP network reachability of the peer device of the VXLAN tunnel, to determine a status of the VXLAN tunnel. For example, the AP device determines whether the VXLAN tunnel has failed.

In embodiments, after the VXLAN tunnel is set up, the AP device may further detect the IP network reachability of the peer device of the VXLAN tunnel, to determine the status of the VXLAN tunnel, and send, to the AC device, the status of the VXLAN tunnel and that is detected by the AP device. In embodiments, the AP device sends a wireless transaction protocol event request (WTP Event Request) to the AC device through the existing CAPWAP control tunnel between the AP device and the AC device. The AP device may also send, to the AC device by using the WTP event request, tunnel status indication information of the VXLAN tunnel and that is detected by the AP device.

The tunnel status of the VXLAN tunnel may be a status of a VXLAN tunnel that is set up by the AP device. If the tunnel status indication information of the VXLAN tunnel indicates that the VXLAN tunnel fails, after the AC device receives the tunnel status indication information of the VXLAN tunnel, the AC device may present an alarm, to notify manual maintenance. Alternatively, the AC device may further perform other processing, for example, configure an alternate tunnel, so that when the VXLAN tunnel fails, the AC device can be switched to the alternate tunnel. The alternate tunnel is different tunnel than the VXLAN tunnel. This facilitates for a backup relationship between the alternate tunnel and the VXLAN tunnel. Therefore, when the VXLAN tunnel fails, the AC device is switched to the alternate tunnel.

For example, if the AC device and the AR device are two independent devices, the peer device of the VXLAN tunnel may be the AR device. The AP device may discover through detection, that the peer AR device of the VXLAN tunnel is in a state in which an IP network is unreachable (for example, when the AP device cannot detect the AR device in a ping manner). The AP device may then send first tunnel status indication information to the AC device, to indicate, based on the first tunnel status indication information, that the tunnel status is an unreachable state. For example, the AP device sends the first WTP event request to the AC device. The first WTP event request carries the first tunnel status indication information, so that the AC device determines, based on the first tunnel status indication information, that the tunnel status is in the unreachable state.

When the AP device discovers, through detection, that the peer AR device of the VXLAN tunnel is restored from the state in which an IP network is unreachable to a state in which an IP network is reachable, the AP device sends second tunnel status indication information to the AC device, to indicate, based on the second tunnel status indication information, that the tunnel status is a reachable state. For example, the AP device sends a second WTP event request to the AC device. The second WTP event request carries the second tunnel status indication information, so that the AC device determines, based on the second tunnel status indication information, that the tunnel status is in the reachable state.

After the AP device detects that the VXLAN tunnel fails, in addition to the foregoing manner of using a WTP event request to carry VXLAN tunnel status indication information, in embodiments, the AP device may further perform an operation in (7) after detecting that the VXLAN tunnel fails.

(7) The AP device sends a WTP alternate tunnel failure indication to the AC device, to report a failure (e.g., Report Failure). The WTP alternate tunnel failure indication carries an AR address(es).

The AP device may determine that the VXLAN tunnel set up by the AP device may have failed. For example, the AP device may detect that the peer device, for example, the AR device, of the VXLAN tunnel set up by the AP device is in a state in which an IP network is unreachable. The AP device may then send a WTP alternate tunnel failure indication to the AC device, to report a failure, so as to notify the AC device that the VXLAN tunnel failed. In addition, the AR address may be carried, and the AR address may be used to notify the AC device of a specific AR device that is the peer device of the VXLAN tunnel.

It should be noted that. Alternate Tunnel Failure Indication is a message element used when an alternate tunnel is set up in RFC 8350. In these embodiments of this application, the message element is extended, so that the message element can be used to indicate that the VXLAN tunnel failed.

(8) The AP device may periodically detect the IP network reachability of the peer device of the VXLAN tunnel, to determine the tunnel status of the VXLAN tunnel. For example, the AP device may determine that the tunnel is restored. After the tunnel is restored, a subsequent operation in (9) is performed.

In these embodiments of this application, a period in which the AP device detects the IP network reachability of the peer device of the VXLAN tunnel is not limited.

(9) The AP device sends a WTP alternate tunnel failure indication (e.g., Alternate Tunnel Failure Indication) to the AC device, to report that a failure is cleared (e.g., Report Clearing Failure).

If the AP device determines that the VXLAN tunnel is restored, for example, after the AP device detects that the peer device of the VXLAN tunnel is restored from the state in which an IP network is unreachable to the state in which an IP network is reachable, the AP device sends the WTP alternate tunnel failure indication to the AC device, to report the clearing failure. In this way, the AP device may notify the AC device that a failure of the VXLAN tunnel has been rectified.

In embodiments, in addition to the IP address of the peer device of the VXLAN tunnel and the virtual network index (VNI) information, the configuration information of the VXLAN tunnel may further include at least one of a VXLAN tunnel backup policy and a switchback policy. The VXLAN tunnel backup policy indicates a VXLAN tunnel backup relationship, and the switchback policy is used to indicate whether to perform switchback after tunnel restoration.

Figure 2:
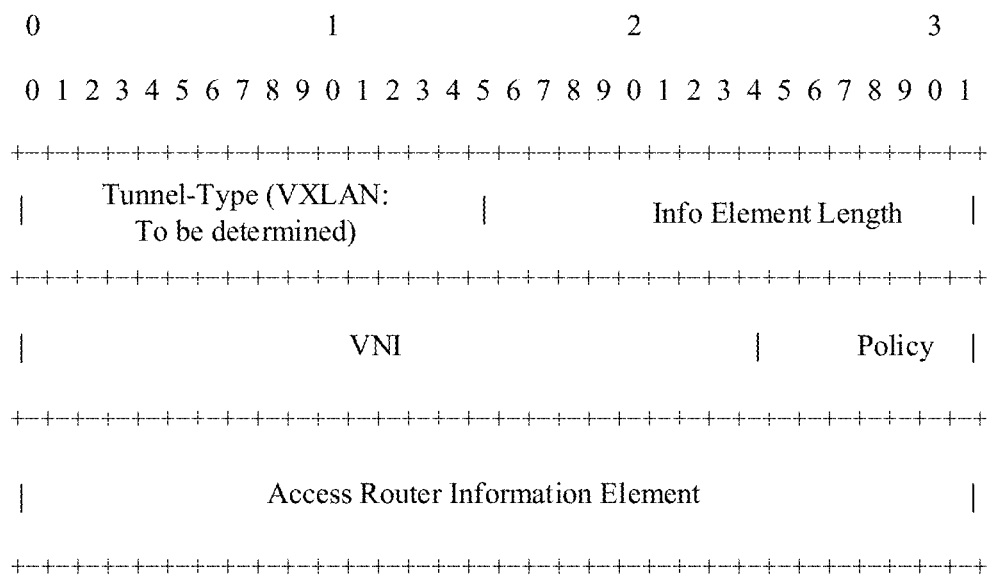
FIG. 2 is a schematic diagram of an extended format of a message element Alternate Tunnel Encapsulations Type according to an embodiment of this application.
Figure 3:
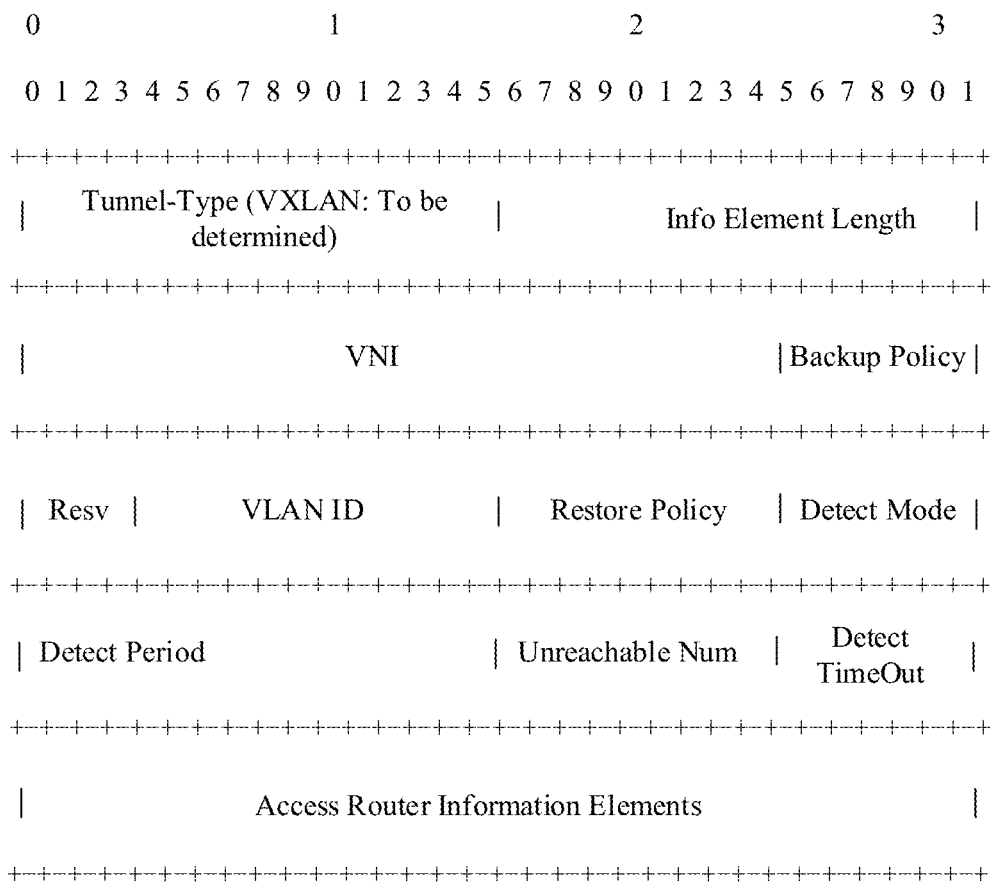
FIG. 3 is a schematic diagram of an extended format of a message element Alternate Tunnel Encapsulations Type according to another embodiment of this application.

The configuration information of the VXLAN tunnel shown in FIG. 2 is used as an example, and an extended format of the message element Alternate Tunnel Encapsulations Type in (3) and (5) includes the following content:

In some embodiments, the AC device may send the configuration information of the VXLAN tunnel to the AP device based on the message shown in FIG. 2 or FIG. 3.

As shown in FIG. 2, a message used to send the configuration information of the VXLAN tunnel includes a tunnel-type, an information element length, a VNI, a policy, and Access Router Information Elements. Meanings of the foregoing fields are as follows:

Tunnel-type is used to carry a tunnel type, for example, a VXLAN.

Info element length is used to carry length information of the VNI, the policy, and Access Router Information Elements.

The VNI is used to carry a VNI corresponding to the VXLAN tunnel. In embodiments, the VNI may correspond to a WLAN ID or an SSID of the AP, and may be used to map, to the VNI, service traffic corresponding to the SSID. In embodiments, the VNI may correspond to a VLAN of the AP, and may be used to map, to the VNI, service traffic corresponding to the VLAN.

The policy is used to carry a backup policy of a plurality of access router AR devices. An optional reference definition is as follows: 0 indicates an active-backup mode, and 1 indicates a load balancing mode. In the active-backup mode, the first valid reachable AR device in Access Router Information Elements serves as an active AR device by default, and another valid reachable AR device serves as a backup AR device. Alternatively, the AP device may automatically select a route, to select from Access Router Information Elements, a tunnel with a best network quality as an active tunnel and select another valid reachable AR device as a backup device. In the load balancing mode, a plurality of valid reachable AR devices in Access Router Information Elements are used for tunnel load balancing.

Access Router Information Elements are used to carry an Internet Protocol version 4 (IPv4) address and/or an Internet Protocol version 6 IPV6 address of the AR device. This message element may include an IP address of one or more AR devices. For a definition and/or example of a message element, refer to "AR IPv4 List Element" and "AR IPV6 List Element" in RFC 8350. In addition, when the AC device has a function of the AR device, this field may include the IP address of the AC device.

As shown in FIG. 3, another message used to send the configuration information of the VXLAN tunnel includes Tunnel-Type. Info Element Length, a VNI, a backup policy, a reserved bit (e.g., Resv), a VLAN ID, a restoration policy (e.g., Restore Policy), a detection mode (e.g., Detect Mode), a detection period (e.g., Detect Period), a quantity of unreachable times (e.g., Unreachable Num), a detection timeout period (e.g., Detect TimeOut), and Access Router Information Elements. Meanings of the foregoing fields are as follows:

Tunnel-Type indicates a tunnel type. In these embodiments of this application, the field indicates a tunnel type ID of a VXLAN or a generic protocol extension for VXLAN (VXLAN-GPE).

The VNI, for example, may be used to map the WLAN ID (which corresponds to a configured SSID) to a VLAN ID. A VLAN is mapped to the VNI, so that service traffic of the SSID is mapped to the VNI, and uplink traffic of a wireless terminal accessed based on a specified SSID is steered to be forwarded through a corresponding VXLAN tunnel.

Backup policy: If a VXLAN tunnel is set up between the AP device and each of a plurality of AR devices, a backup policy of the VXLAN tunnels between the AP device and a plurality of AR devices is defined. An optional reference definition is as follows: 0 indicates an active-backup mode, and 1 indicates a load balancing mode. In the active-backup mode, a tunnel between the AP device and the first valid reachable AR device may serve as an active tunnel by default. Alternatively, the AP device may automatically select a route, to select a tunnel with the best network quality as an active tunnel. Because a VXLAN tunnel is set up between the AP device and one AR device, when the AP device separately sets up VXLAN tunnels with a plurality of AR devices, there are a plurality of VXLAN tunnels, and the plurality of VXLAN tunnels may be used as a backup group. Therefore, in the load balancing mode, the VXLAN tunnels between the AP device and the plurality of AR devices may be used for tunnel load balancing. If a tunnel fails, load balancing may be performed for the uplink traffic on a remaining VXLAN tunnel in the backup group.

Resv indicates a reserved field, and is considered as 0 by default.

The VLAN ID indicates a service VLAN ID of the AP device, and is used to map a service VLAN (which may be a global VLAN of the device) of the AP device to the VNI. In embodiments, the AC device may configure a service VLAN corresponding to an SSID of the AP device, or bind a service VLAN to a LAN interface of the AP device, or grant a service VLAN to the terminal, so that uplink traffic of a wireless terminal accessed based on a corresponding SSID, uplink traffic of a LAN wired terminal, or uplink traffic of a terminal to which a corresponding VLAN is granted may be separately steered to a corresponding VXLAN tunnel based on the VLAN ID.

The restoration policy (Restore Policy) defines a switchback policy after a failure of the VXLAN tunnel to an active AR device is rectified, and becomes valid when the backup policy is an active-backup mode. An optional reference definition is as follows: 0 indicates that switchback is not actively performed, and the AR device is switched back to the restored active tunnel only when a selected alternate tunnel fails.

The detection mode (Detect Mode) indicates a VXLAN tunnel detection mode. An optional definition is as follows: 0 indicates to perform no detection; 1 indicates VXLAN OAM; and 2 indicates ping.

The quantity of unreachable times (Unreachable Num) indicates a threshold of a quantity of times that the AP device detects that the peer device of the VXLAN tunnel is in a state in which an IP network is unreachable. When the quantity reaches the threshold, it is determined that the tunnel becomes invalid. For example, the AP device sends a detection packet, to detect whether the peer device of the VXLAN tunnel is in a state in which an IP network is unreachable. The quantity of unreachable times herein is a quantity of times that there is no response to the detection packet or there is a response timeout. For example, a value range of the quantity of unreachable times may be from 0 to 30, and a default value is 3. This parameter becomes valid when the detection mode is not 0.

The detection timeout period (Detect TimeOut) indicates a timeout period in which the AP device detects whether a peer device of a VXLAN tunnel is in a state in which an IP network is unreachable. For example, a value range of the detection timeout period is from 0 s to 30 s, and a default value is 3 s. This parameter becomes valid when the detection mode is not 0.

The detection period (Detect Period) indicates a detection packet sending period. The detection packet is used by the AP device to detect whether the peer device of the VXLAN tunnel is in a state in which an IP network is unreachable. For example, a value range of the detection period is from 1 s to 3600 s, and a default value is 1 s. This parameter becomes valid when the detection mode is not 0.

Access Router Information Elements is used to carry an IPV4 address and/or an IPV6 address of an AR device, and the message element may include an IP address of one or more AR devices. For a definition and/or example, refer to "AR IPv4 List Element" and "AR IPV6 List Element" in RFC 8350).

It should be noted that the extended format of the message element "Alternate Tunnel Encapsulations Type" includes, but is not limited to, the foregoing reference format. For example, the message element "Alternate Tunnel Encapsulations Type" may alternatively include only Tunnel-Type, the VNI, the VLAN ID, and Access Router Information Elements or include Tunnel-Type, the VNI, the VLAN ID, and Access Router Information Elements by using a sub-message element. Optionally, the message element "Alternate Tunnel Encapsulations Type" may further include one or more parameters of a backup policy, a detection mode, a quantity of unreachable times, a detection timeout period, a detection period, and a switchback policy.

In embodiments, in the method provided in these embodiments of this application, an extension of a message format "IEEE 802.11 WTP Alternate Tunnel Failure Indication" is further supported, to indicate a case in which a VXLAN tunnel corresponding to a service VLAN fails when the AP device supports wired access. Certainly, a new message may alternatively be defined to send tunnel status information. For example, as shown in FIG. 4, a tunnel status is indicated by using an alternate tunnel failure indication message, and the alternate tunnel failure indication message may be obtained by extending the message "IEEE 802.11 WTP Alternate Tunnel Failure Indication". In addition to a WLAN ID. Status, and Access Router Information Elements, the message includes a service mode and VLAN ID information.

Mode indicates a service mode. An optional reference definition is as follows: 0 indicates only wireless access, and a default value of the field is 0; and 1 indicates wireless access+wired access. The VLAN ID (mapped to the VNI) and the IP address of the AR are used to indicate a tunnel that fails.

The VLAN ID is used to identify a service VLAN. The AC device may find a corresponding VNI based on the VLAN ID, and determine, based on the VNI and an IP address in Access Router Information Element, a VXLAN tunnel that fails.

In some embodiments, the VLAN ID in FIG. 4 may be replaced with a VNI. Therefore, the AC device may determine, based on the VNI in FIG. 4 and the IP address in Access Router Information Element, the VXLAN tunnel that fails. In addition, a new message may be defined to transfer a status of the VXLAN tunnel.

Devices in these embodiments of this application include the AC device, the AP device, and the AR device. It may be supported to use the AC device in these embodiments of this application as a border gateway protocol (BGP) route reflector (RR); it is supported to generate host routing information and MAC routing information based on information such as an IP address that is of a station and that is obtained based on a case in which the AP device sends information about the terminal (Station) (for example, a message element Add Station), and a case in which the AC device serves as an authentication point. The AC device may then disseminate L2 and/or L3 routing information (which carry/carries VXLAN tunnel information) to a corresponding AR device by using BGP-Ethernet Virtual Private Network-VXLAN (BGP-EVPN-VXLAN).

The AC device supports configuring that a type of a data tunnel used by the AP device is a VXLAN. A local end of the VXLAN tunnel is the AP device, and a peer device of the VXLAN tunnel is a device corresponding to the AP device in the VXLAN tunnel. For example, the peer device of the VXLAN tunnel is an AC device or a plurality of AC member devices in a backup group including the AC device. For example, the AC device may configure, based on an AP device group, the type of the data tunnel to be a VXLAN, specify an IP address of a peer AC device of the VXLAN tunnel, and then specify VNI information. The VNI information includes a VNI or a VNI mapping relationship, and the VNI mapping relationship includes at least one of a mapping relationship between an SSID and a VNI, a mapping relationship between a VLAN and a VNI, and a mapping relationship between a VLAN pool and a VNI. For example, the AC device may configure, based on the SSID, the type of the data tunnel to be a VXLAN, and specify a VNI to which the SSID is mapped and the IP address of the peer AC device of the VXLAN tunnel. The AC device may alternatively directly configure a VLAN used by the AP device, or a VNI to which a VLAN pool is mapped and an IP address of the peer AC device of the VXLAN tunnel.

In these embodiments of this application, the AP device generates tunnel encapsulation information and routing information based on the configuration information of the VXLAN tunnel and that is sent by the AC device, to set up a tunnel between the AP device and the AR device. In addition, the AP device may further detect the IP network reachability of the peer device of the VXLAN tunnel, and when discovering that the peer device of the VXLAN tunnel is in a state in which an IP network is unreachable, switch traffic to an alternate VXLAN tunnel in a timely manner, generate tunnel status indication information, and send the tunnel status indication information to the AC device, so that the AC device generates an alarm or performs subsequent processing.

Figure 5:
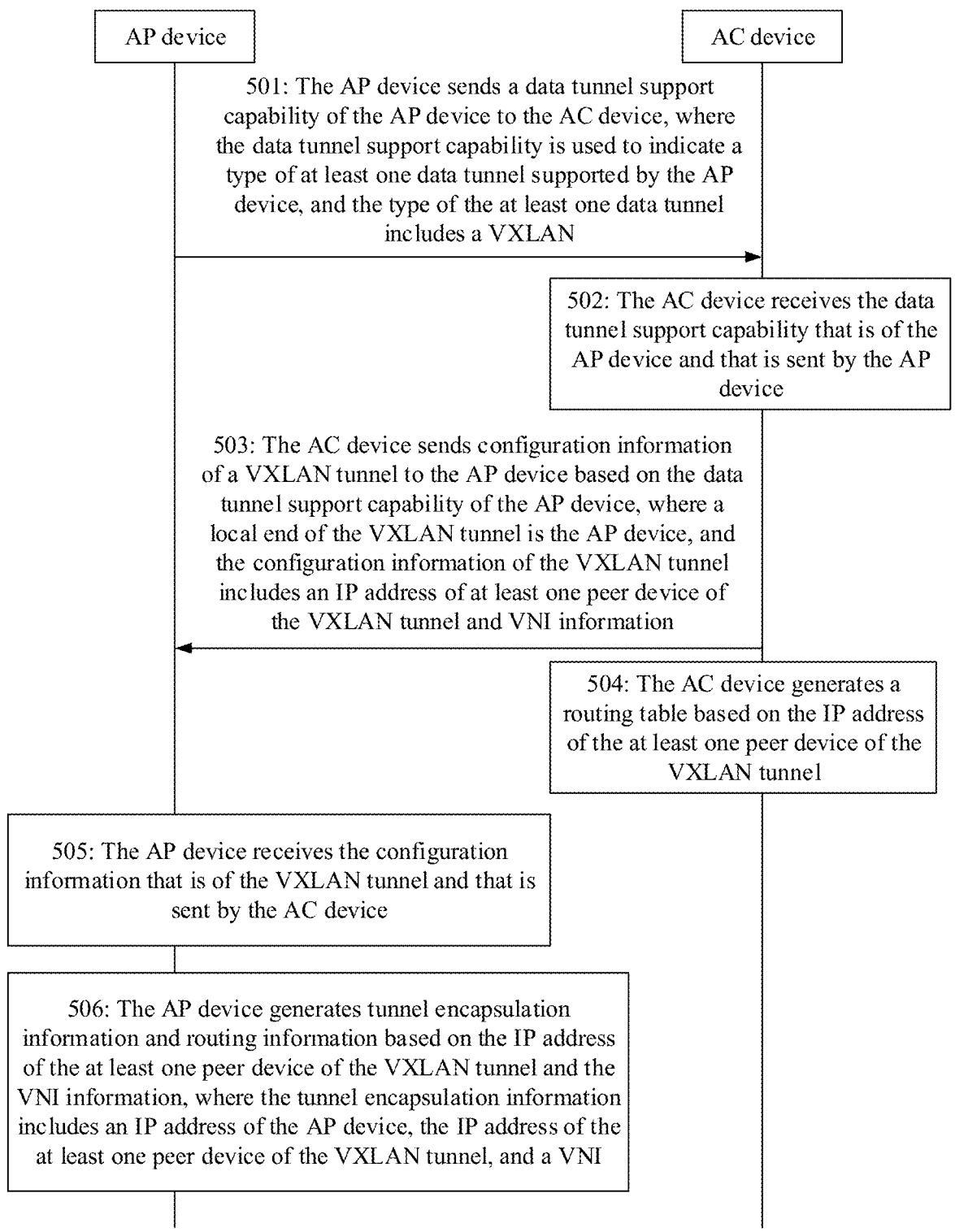
FIG. 5 is a schematic interaction diagram of a tunnel configuration method according to an embodiment of this application.

As shown in FIG. 5, a tunnel configuration method provided in these embodiments of this application may include the following several processes.

501: An AP device sends a data tunnel support capability of the AP device to an AC device, where the data tunnel support capability is used to indicate a type of at least one data tunnel supported by the AP device, and the type of the at least one data tunnel includes a VXLAN.

For example, the AP device discovers the AC device in a manner such as a CAPWAP discovery mechanism, and actively sets up a CAPWAP control session with the AC device. As shown in FIG. 1, the AP device may send the data tunnel support capability of the AP device by using a CAPWAP JoinRequest. For example, the AP device uses the JoinRequest to carry a message element Supported Alternate Tunnel Encapsulations of the AP device, which sends information including a list of the type of the data tunnel supported by the AP device. The list of the type of the data tunnel includes the type of the at least one data tunnel, and the type of the at least one data tunnel includes a VXLAN tunnel. The AP device may alternatively send to the AC device in another sending manner, a tunnel type supported by the AP device.

As described above, the message element Supported Alternate Tunnel Encapsulations is a message element used when an alternate tunnel is set up in RFC 8350. In these embodiments of this application, the message element is extended, so that the message element can be used to carry the list of the type of the data tunnel supported by the AP device. In other words, "Supported Alternate Tunnel Encapsulations" herein is a name of the message element, and does not mean that the VXLAN tunnel set up in these embodiments of this application is definitely an alternate tunnel.

502: The AC device receives the data tunnel support capability of the AP device and that is sent by the AP device.

For example, the AC device, described in (1) in FIG. 1, receives the JoinRequest which carries Supported Alternate Tunnel Encapsulations sent by the AP device. The AC device discovers, based on Supported Alternate Tunnel Encapsulations carried in JoinRequest, that the AP device supports a VXLAN tunnel type.

503: The AC device sends configuration information of the VXLAN tunnel to the AP device based on the data tunnel support capability of the AP device, where a local end of the VXLAN tunnel is the AP device, and the configuration information of the VXLAN tunnel includes an IP address of at least one peer device of the VXLAN tunnel and VNI information.

In the method provided in these embodiments of this application, a network management person uses an SDN controller, a network management system, or a web user interface (UI) or a command line interface (CLI) interface built in the AC device to configure, for the AC device, that a type of a data tunnel used by the AP device is a VXLAN.

If the AC device has an AR function, the peer device of the VXLAN tunnel is the AC device or a plurality of AC member devices (which usually serve as an active/backup device) in a backup group including the AC device. The network management person configures, based on an AP device group, that the type of the data tunnel is a VXLAN, and specifies an IP address of a peer AC device of the VXLAN tunnel. If the AC device and an AR device are two independent devices, and the AC device does not have a function of the AR device, the peer device of the VXLAN tunnel is the AR device. The IP address of the peer device and that is included in the configuration information of the VXLAN tunnel is an IP address of the AR device and the VNI information.

In addition, regardless of whether the AC device has the function of the AR device, the network management person may configure the VNI information. The VNI information includes a VNI or a VNI mapping relationship. The VNI mapping relationship includes one or more of a mapping relationship between an SSID and a VNI, a mapping relationship between an AP VLAN and a VNI, and a mapping relationship between a VLAN pool and a VNI. For example, the network management person may configure, based on the SSID, the type of the data tunnel to be a VXLAN, specify a VNI to which the SSID is mapped, and the IP address of the peer AC device of the VXLAN tunnel. Alternatively, the AC device may directly configure a VNI to which a VLAN used by the AP is mapped and the IP address of the peer AC device of the VXLAN tunnel. Alternatively, the AC device may directly configure a VNI to which a VLAN pool used by the AP is mapped and the IP address of the peer AC device of the VXLAN tunnel.

After the AC device receives the data tunnel support capability of the AP device sent by the AP device, the AC device obtains the configuration information of the VXLAN tunnel based on the data tunnel support capability of the AP device, and sends the configuration information of the VXLAN tunnel to the AP device. The configuration information of the VXLAN tunnel includes the IP address of the at least one peer device of the VXLAN tunnel and the VNI information. The local end of the VXLAN tunnel is the AP device, and the VNI information includes the VNI or the VNI mapping relationship.

For example, after discovering that the AP device supports the VXLAN tunnel, the AC device uses a CAPWAP WLAN configuration request message to carry a message element Alternate Tunnel Encapsulations Type, and sends the configuration information of the VXLAN tunnel to the AP device by using the message element Alternate Tunnel Encapsulations Type. In embodiments, the configuration information that is of the VXLAN tunnel and that is sent by the AC device to the AP device may reflect a configuration solution. If the content of the configuration information changes, a configuration solution reflected by the configuration information also changes accordingly. There are at least two configuration solutions, and are not limited to the examples disclosed below:

1. Configure that one AP device is integrally connected to one or more AR devices regardless of a specific service (for example, traffic corresponding to different SSIDs or service VLANs is forwarded to a same AR device through the VXLAN tunnel). It is then supported to configure a VXLAN peer list, a peer backup relationship, a tunnel detection parameter, and a switchback policy of the AP device.

2. The AR device is selected based on a service, and service traffic corresponding to different SSIDs or VLANs can be forwarded to different AR devices. For example, the AC device configures a mapping relationship between a service VLAN of the AP device and a VNI. (one or more) peer devices of the VNI, a peer device backup relationship, a tunnel detection parameter (including but not limited to a detection solution, a detection period, and a quantity of unreachable times of detection for determining a failure), and a switchback policy. Then, a service VLAN is configured based on the SSID, the service VLAN is bound to a LAN interface, or the service VLAN is granted to a terminal, so that uplink traffic of a wireless terminal accessed based on the corresponding SSID, uplink traffic of a LAN wired terminal, or uplink traffic of a terminal to which a corresponding VLAN is granted can be steered to a corresponding VXLAN tunnel. It can be easily learned that the second manner is more flexible. During implementation, a manner to be selected is not limited to these embodiments of this application.

After the VXLAN tunnel is configured, the AC device sends the configuration information of the VXLAN tunnel to the AP device. For example, the configuration information of the VXLAN tunnel may be carried in a WLAN configuration request together with the message element Add-WLAN for sending, to improve configuration efficiency. Optionally, the configuration information of the VXLAN tunnel may be sent separately from another message element. This is not limited to these embodiments of this application.

504: The AC device generates a routing table based on the IP address of the at least one peer device of the VXLAN tunnel.

The AC device supports configuring that the type of the data tunnel used by the AP device is a VXLAN. If the AC device has the AR function, the peer device of the VXLAN tunnel may be, for example, the AC device or a plurality of AC member devices in a backup group including the AC device. The AC device may configure, based on the AP device group, that the type of the data tunnel is a VXLAN, and specify that the IP address of the peer device of the VXLAN tunnel is the IP address of the AC device. The AC device generates the routing table based on the IP address of the AC device and the IP address of the AP device. If the AC device does not have the AR function, the AC device may configure, based on the AP device, that the type of the data tunnel is a VXLAN, and specify that the IP address of the peer device of the VXLAN tunnel is the IP address of the AR device. The AC device generates the routing table based on the IP address of the AR device and the IP address of the AP device.

In embodiments, if the AC device has an AR function, one end of the VXLAN tunnel is the AP device, and the other end is the AC device. In addition to generating the routing table, the AC device may further generate the tunnel encapsulation information based on the IP address of the AP device, the IP address of the AC device, and the VNI.

It should be noted that, in addition to performing step 503 and then performing step 504, the method provided in these embodiments of this application may further be performed in a sequence of performing step 504 and then performing step 503. In other words, the AC device may send the configuration information of the VXLAN tunnel to the AP device based on the data tunnel support capability of the AP device, and then generate the routing table based on the configuration information of the VXLAN tunnel. Alternatively, the AC device may generate the routing table based on the configuration information of the VXLAN tunnel, and then send the configuration information of the VXLAN tunnel to the AP device based on the data tunnel support capability of the AP device. An execution sequence of step 503 and step 504 is not limited to these embodiments of this application.

505: The AP device receives the configuration information of the VXLAN tunnel sent by the AC device.

For example, a manner in which the AP device receives the configuration information of the VXLAN tunnel may be determined based on a manner in which the AC device sends the configuration information of the VXLAN tunnel. For example, if the AC device uses the CAPWAP WLAN configuration request to carry the configuration information of the VXLAN tunnel and the message element Add-WLAN together for sending, the AP device receives the configuration information of the VXLAN tunnel and that is carried in the CAPWAP WLAN configuration request together with the message element Add-WLAN for sending.

506: The AP device generates the tunnel encapsulation information and the routing information based on the IP address of the at least one peer device of the VXLAN tunnel and the VNI information, where the tunnel encapsulation information includes the IP address of the AP device, the IP address of the at least one peer device of the VXLAN tunnel, and the VNI.

In embodiments, the routing information includes, but is not limited to, the following: A next hop of a default route is the peer device of the VXLAN tunnel. The tunnel encapsulation information includes, but is not limited to, an IP of a destination end of a tunnel, a VNI, and an IP address of a source end, and may further include a parameter such as a source group ID. The default route is a route on the AP device, and the default route may be set by the AC device. For example, if traffic is forwarded by the AP device to an AR device, the AC device sets a default route to the AR device.

The configuration information of the VXLAN tunnel and that is received by the AP device includes the IP address of the peer device of the VXLAN tunnel and the VNI information. That the AC device has an AR function and the VNI information is a mapping relationship between an SSID and a VNI is used as an example. For the AP device, the local device of the VXLAN tunnel is the AP device, and the peer device of the VXLAN tunnel may be the AC device. In other words, the destination end of the VXLAN tunnel is the AC device, and the source end is the AP device. The AP device may determine an SSID corresponding to a terminal that accesses the AP device, and further determine, based on the mapping relationship between an SSID and a VNI, the VNI corresponding to the SSID of the terminal. The AP device can determine the tunnel encapsulation information of the VXLAN tunnel based on information such as the VNI, an IP of the AC device at the destination end, and an IP of the AP device at the source end.

For example, the AC device has the AR function, and the VNI information is a mapping relationship between a VLAN and a VNI. For the AP device, the local device of the VXLAN tunnel is the AP device, and the peer device of the VXLAN tunnel may be the AC device. In other words, the destination end of the VXLAN tunnel is the AC device, and the source end is the AP device. The AP device may determine a VLAN corresponding to a terminal that accesses the AP device, and further determine, based on the mapping relationship between a VLAN and a VNI, a VNI corresponding to the VLAN of the terminal. The AP device can determine the tunnel encapsulation information of the VXLAN tunnel based on information such as the VNI, an IP of the AC device at the destination end, and an IP of the AP device at the source end.

In embodiments, after the VXLAN tunnel is set up, the AP device may further detect IP network reachability of the peer device of the VXLAN tunnel. When detecting that a peer device of any VXLAN tunnel is in a state in which an IP network is unreachable, or when detecting that a peer device of any VXLAN tunnel is restored from a state in which an IP network is unreachable to a state in which an IP network is reachable, the AP device sends tunnel status indication information to the AC device. The tunnel status indication information is used to indicate a tunnel status. In other words, the tunnel status indication information is used to indicate a state in which a tunnel is unreachable, or is used to indicate that a tunnel is restored to a reachable state after a failure occurs. A manner of detecting whether the peer device of the VXLAN tunnel is restored from the state in which an IP network is unreachable to the state in which an IP network is reachable is not limited to these embodiments of this application. For example, the AP device may record a status of the VXLAN tunnel. If the peer device of the VXLAN tunnel is in the state in which an IP network is unreachable during previous detection of a tunnel status, and then the peer device of the VXLAN tunnel is in the state in which an IP network is reachable during subsequent detection of the tunnel status, it is determined that the peer device of the VXLAN tunnel is restored from the state in which an IP network is unreachable to the state in which an IP network is reachable.

For example, any VXLAN tunnel in a VXLAN tunnel on which the AP device is located is a first VXLAN tunnel. The AP device detects IP network reachability of a peer device of the first VXLAN tunnel. When detecting that the peer device of the first VXLAN tunnel is in a state in which an IP network is unreachable, the AP device sends first tunnel status indication information to the AC device. The first tunnel status indication information is used to indicate that a tunnel status is an unreachable state. Alternatively, when detecting that the peer device of the first VXLAN tunnel is in a state in which an IP network is reachable, the AP device sends second tunnel status indication information to the AC device. The second tunnel status indication information is used to indicate that a tunnel status is a reachable state.

The AC device receives the tunnel status indication information sent by the AP device. For example, the AP device may periodically detect IP network reachability of a peer device of a VXLAN tunnel, and whether the peer device of the VXLAN tunnel is restored from a state in which an IP network is unreachable to a state in which an IP network is reachable. A detection period length is not limited to these embodiments of this application, and may be determined based on configuration. For example, the period length may be configured based on an application scenario.

A manner in which the AP device sends the tunnel status indication information to the AC device is not limited to these embodiments of this application. For example, the AP device sends a WTP event request to the AC device through an existing CAPWAP control tunnel between the AP device and the AC device, and notifies, by using the WTP event request, the AC device of the VXLAN tunnel status indication information sensed by the AP device.

A status of the VXLAN tunnel may be a VXLAN tunnel that is set up by the AP device. If the VXLAN tunnel status indication information indicates that the VXLAN tunnel fails, for example, a peer device of the VXLAN tunnel is in a state in which an IP network is unreachable, after the AC device receives the VXLAN tunnel status indication information, the AC device may present an alarm, to notify manual maintenance. Alternatively, the AC device may further perform other processing, for example, configure an alternate tunnel, so that when the VXLAN tunnel fails, the AC device can be switched to the alternate tunnel.

For example, that the AP device sends the first tunnel status indication information to the AC device includes: The AP device sends a first WTP event request to the AC device. The WTP event request carries the first tunnel status indication information. That the AP device sends the second tunnel status indication information to the AC device includes: The AP device sends a second WTP event request to the AC device. The second WTP event request carries the second tunnel status indication information.

In embodiments, if the AC device configures a VXLAN tunnel backup relationship (for example, a load balancing mode or an active-backup mode) for the AP device, when the AP device detects that the peer device of the first VXLAN tunnel is in a state in which an IP network is unreachable, the method provided to these embodiments of this application further includes: The AP device switches, based on the configured VXLAN tunnel backup relationship to an alternate VXLAN tunnel corresponding to the first VXLAN tunnel, uplink traffic forwarded by the terminal through the AP device.

In embodiments, if the AC device configures a switchback policy for the AP device (for example, this parameter becomes valid in the active-backup mode, to determine whether to perform switchback when the active tunnel is restored), after the AP device switches, to the alternate VXLAN tunnel corresponding to the first VXLAN tunnel, the uplink traffic forwarded by the terminal through the AP device, the method provided in these embodiments of this application further includes: after detecting that the peer device of the first VXLAN tunnel is restored from a state in which an IP network is unreachable to a state in which an IP network is reachable, determining, based on the configured tunnel switchback policy, whether to switch the uplink traffic back to the first VXLAN tunnel.

In embodiments, when the AP device serves as an authentication point of the terminal, after the terminal is authenticated or goes online, the AP device sends related information of the terminal to the AC device. The related information of the terminal includes, but is not limited to, an IP address of the terminal, or an IP address and a MAC address of the terminal.

The AC device receives the related information that is of the terminal and that is sent by the AP device when the AP device serves as an authentication point of the terminal, and generates a host routing entry of the terminal based on the related information of the terminal. A next hop of the host routing entry points to the AP device through the VXLAN tunnel. The AC device may perform route dissemination with an AR device that is configured for the AP device and that serves as a VXLAN peer of the AP device. For example, the AC device separately disseminates, based on an automatically configured routing policy, the host routing entry of the terminal to a peer AR device of a VXLAN tunnel corresponding to an AP device accessed by the terminal. An outbound interface of the route is a VXLAN tunnel that points to the AP device accessed by the terminal, to ensure that network downlink traffic that is of the AR device and that corresponds to the terminal can be normally forwarded to the AP device through the VXLAN tunnel.

In addition, if the AC device serves as the authentication point of the terminal, the AP device forwards an uplink pre-authentication packet of the terminal to the AC device through a CAPWAP data tunnel or a pre-configured VXLAN tunnel layer 2, and the AC device obtains the related information of the terminal when completing authentication of the terminal. For example, media access control/IP (MAC/IP) information and/or authorized VLAN information of the terminal, and generates a host routing entry based on the MAC/IP information and/or authorized VLAN information of the terminal. If there is authorized VLAN information, the AC device sends the authorized information of the terminal to the AP device for policy association.

In embodiments, after the AC device generates the host routing entry of the terminal based on the related information of the terminal, the method further includes: deleting the host routing entry of the terminal after the terminal goes offline; or updating the host routing entry of the terminal after the terminal roams to another AP device. The host routing entry of the terminal is deleted, to save a storage resource.

In embodiments, after the AC device generates the host routing entry of the terminal based on the related information of the terminal, the method further includes: disseminating the L2/3 routing information of the terminal to a corresponding AR device. The L2/3 routing information of the terminal carries the VXLAN tunnel information.

In embodiments, after the VXLAN tunnel is set up, packet transmission may be performed based on the VXLAN tunnel. For example, the AP device receives an IEEE 802.11 data packet of the terminal; converts the IEEE 802.11 data packet into an IEEE 802.3 ethernet frame; generates a route based on a tunnel forwarding table and a VNI mapping relationship; encapsulates, with a corresponding VXLAN tunnel header based on the route, an IEEE 802.3 ethernet frame to be sent to the peer device of the VXLAN tunnel, to obtain a first VXLAN packet; and forwards the first VXLAN packet to the peer device of the VXLAN tunnel.

In embodiments, the AC device receives the first VXLAN packet sent by the AP device, and performs VXLAN decapsulation on the first VXLAN packet, to obtain the IEEE 802.3 ethernet frame obtained through decapsulation; determines forwarding information based on a VNI mapping relationship in a VXLAN tunnel header of the IEEE 802.3 ethernet frame; and modifies the IEEE 802.3 ethernet frame based on the forwarding information, and sends the modified IEEE 802.3 ethernet frame to an uplink routing device, or re-encapsulates the IEEE 802.3 ethernet frame with the VXLAN tunnel header and sends the re-encapsulated IEEE 802.3 ethernet frame to an AP device in which a destination terminal is located.

In embodiments, the VNI mapping relationship used when the AP device generates a route may be sent by the AC device. The VNI mapping relationship includes at least one of a mapping relationship between a SSID and a VNI, a mapping relationship between a VLAN and a VNI, and a mapping relationship between a VLAN pool and a VNI.

Further, the AC device may further receive a downlink packet of the terminal, and search for the host routing entry of the terminal; encapsulate the downlink packet with a VXLAN tunnel header based on the found host routing entry, to obtain a second VXLAN packet; and send the second VXLAN packet to the AP device in which the destination terminal is located.

The AP device receives a second VXLAN packet sent by the peer device of the VXLAN tunnel, namely, the AC device; performs VXLAN decapsulation on the second VXLAN packet, to obtain the IEEE 802.3 ethernet frame obtained through decapsulation; determines forwarding information based on a VNI mapping relationship in a VXLAN header of the IEEE 802.3 ethernet frame; and modifies the IEEE 802.3 ethernet frame based on the forwarding information, converts the modified IEEE 802.3 ethernet frame into an IEEE 802.11 data packet, and sends the data packet to a corresponding terminal.

It should be noted that the peer device of the VXLAN tunnel of the AP device may be the AC device, or may be the AR device. For example, if the AC device and the AR device are a combined device, the peer device of the VXLAN tunnel of the AP device may be the AC device, and the AC device has the AR function. If the AC device and the AR device are two separated devices, the peer device of the VXLAN tunnel of the AP device may be the AR device.

If the peer device of the VXLAN tunnel of the AP device is the AR device, if the AR device receives a VXLAN packet, the AR device performs VXLAN decapsulation, maps the VXLAN packet to a corresponding BD gateway based on a VNI in a VXLAN tunnel header, and searches, for a route, a VPN routing pool in which the BD gateway is located, or searches a MAC forwarding table, to obtain forwarding information. Then, the AR device modifies, based on the forwarding information, the 802.3 ethernet frame obtained after VXLAN decapsulation, and sends the modified 802.3 ethernet frame to an uplink routing device (for example, internet access traffic), or re-encapsulates the modified 802.3 ethernet frame with the VXLAN tunnel header, and sends the re-encapsulated 802.3 ethernet frame to the AP in which the destination terminal is located (for example, access traffic between terminals). After receiving the downlink packet of the terminal, and searching for the host routing entry, the AR device encapsulates the downlink packet with the VXLAN tunnel header based on the host routing entry, and forwards an encapsulated VXLAN packet to the AP device in which the destination terminal is located.

According to the method provided in these embodiments of this application, a WLAN network can be virtualized, and a WLAN AC is supported to indicate, by using a CAPWAP control protocol, to use an AP VXLAN as a data tunnel, and to specify that a remote AC device or AR device is used as a peer device of the VXLAN tunnel of the AP device, so that the VXLAN covers a network edge device of the WLAN. A manner of deploying a gateway in a VXLAN in a distributed or centralized manner is supported, and routing information or forwarding table information can be disseminated without a need to use a protocol such as a LISP, so as to simplify an implementation of the AP device, and reduce consumption of L2 and/or L3 routing or forwarding table resources of the AP device.

Figure 6:
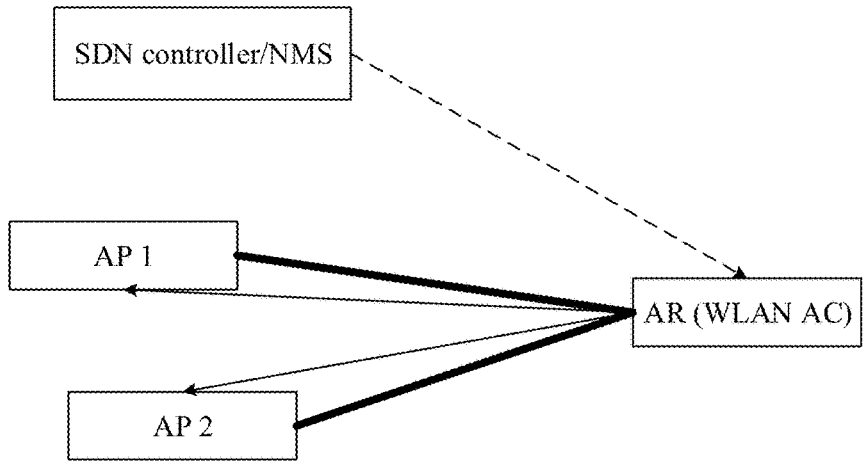
FIG. 6 is a schematic diagram of a structure of a communication system according to an embodiment of this application.

Next, a system shown in FIG. 6 is used as an example to describe the tunnel configuration method provided in the embodiments of this application. As shown in FIG. 6, a WLAN AC device and an AR device may be one device, and the one device is an AR (WLAN AC) shown in FIG. 6. The AR (WLAN AC) may be a WLAN AC device that also provides a function of the AR device, or may be used as a native AC device that provides a function of the WLAN AC device on the AR device. The AR device may alternatively be a switch device having an L3 routing function. In the embodiment shown in FIG. 6, for ease of subsequent description, the AR (WLAN AC) is referred to as an AC device for short, and that an AP 1 device in the AP 1 device and an AP 2 device interacts with the AC device to implement the tunnel configuration method is used as an example for description. For example, the AP 1 device sends a data tunnel support capability of the AP 1 device to the AC device, and indicates, based on the data tunnel support capability, that a type of at least one data tunnel supported by the AP 1 device includes a VXLAN. The AC device configures that the AP 1 device uses the VXLAN as a data tunnel. The AC device serves as a VXLAN egress gateway. A VXLAN network including the AP device and the AC device may configure the AC device as a centralized gateway or a distributed gateway. The AP device may serve as a gateway of a local L3 route, and configure a default route. A next hop points to the VXLAN egress gateway. In the system shown in FIG. 6, the tunnel configuration method includes the following interaction processing process.

61: The AC device sends a VNI mapping relationship and an IP address of the AP 1 device to the AP 1 device based on configuration.

The VNI mapping relationship and the IP address of the AP 1 device are used as configuration information of a VXLAN tunnel. The VNI mapping relationship includes at least one of a mapping relationship between an SSID and a VNI, a mapping relationship between a VLAN and a VNI, and a mapping relationship between a VLAN pool and a VNI. A manner of sending the configuration information of the VXLAN tunnel is not limited in these embodiments of this application. For example, the AC device uses an extended CAPWAP WLAN configuration request to carry the configuration information of the VXLAN tunnel such as the VNI mapping relationship and the IP address of the AP 1 device, and sends the configuration information of the VXLAN tunnel to the AP 1 device by using the extended CAPWAP configuration request.

For example, in the system shown in FIG. 6, the VXLAN tunnel is a tunnel between the AP 1 device and the AC device. For the AP 1 device, a local end of the VXLAN tunnel is the AP 1 device, and a peer device of the VXLAN tunnel is the AC device. Therefore, the IP address of the peer device of the VXLAN tunnel may be an IP address of the AC device.

In addition, the configuration information of the VXLAN tunnel may further include at least one of a VXLAN tunnel backup policy and a switchback policy. The VXLAN tunnel backup policy indicates a VXLAN tunnel backup relationship, and the switchback policy is used to indicate whether to perform switchback after tunnel restoration.

In embodiments, the AP device includes a local forwarding mode and a centralized forwarding mode. In the centralized forwarding mode, the AP device does not serve as an authentication point. All information is authenticated and forwarded by the AC device. In the local forwarding mode, the AP device may serve as an authentication point, and the AP device performs authentication and forwarding. In these embodiments of this application, because the AC device sends the configuration information of the VXLAN tunnel to the AP 1 device, after the AP 1 device implements tunnel configuration based on the configuration information of the VXLAN tunnel, local forwarding can be implemented. Therefore, the AC device may set the AP 1 device to the local forwarding mode.

62: The AC device determines tunnel encapsulation information and routing information of the VXLAN tunnel.

The AC device supports to configure that a type of a data tunnel used by the AP 1 device is a VXLAN. One end of the VXLAN tunnel is the AC device, and the other end is the AP 1 device. For the AC device, a local device of the VXLAN tunnel is the AC device, and a peer device of the VXLAN tunnel is the AP 1 device. In other words, a destination end of the VXLAN tunnel is the AP 1 device, and a source end is the AC device. The AC device may determine an SSID or a VLAN corresponding to a terminal that accesses the AP 1 device, and the AC device can obtain a configured VNI mapping relationship. The VNI mapping relationship includes at least one of a mapping relationship between an SSID and a VNI, a mapping relationship between a VLAN and a VNI, and a mapping relationship between a VLAN pool and a VNI. Therefore, the AC device may determine, based on the VNI mapping relationship, a VNI corresponding to the SSID or the VLAN of the terminal, and the AC device can determine the tunnel encapsulation information of the VXLAN tunnel based on information such as the VNI, the IP address of the AP 1 device at the destination end, and the IP address of the AC device at the source end.

In addition, the AC device may determine information such as an IP address and MAC of the terminal that accesses the AP 1 device, and the AC device may also determine an IP address of the AP 1 device. Therefore, the AC device may generate corresponding routing information.

63: The AP 1 device receives an IP address of at least one peer device of the VXLAN tunnel and the VNI mapping relationship that are sent by the AC device, and generates tunnel encapsulation information and routing information based on the IP address of the at least one peer device of the VXLAN tunnel and the VNI mapping relationship.

The configuration information that is of the VXLAN tunnel and that is received by the AP 1 device includes the IP address of the peer device of the VXLAN tunnel. For the AP 1 device, the local device of the VXLAN tunnel is the AP 1 device, and the peer device of the VXLAN tunnel is the AC device. In other words, the destination end of the VXLAN tunnel is the AC device, and the source end is the AP 1 device. The AP 1 device may determine an SSID or a VLAN corresponding to the terminal that accesses the AP 1 device, and the VNI mapping relationship received by the AP 1 includes at least one of the mapping relationship between an SSID and a VNI, the mapping relationship between a VLAN and a VNI, and the mapping relationship between a VLAN pool and a VNI. Therefore, the AP 1 device may determine, based on the VNI mapping relationship, the VNI corresponding to the SSID or the VLAN of the terminal, and the AP 1 device can determine the tunnel encapsulation information of the VXLAN tunnel based on information such as the VNI, the IP address of the AC device at the destination end, and the IP address of the AP 1 device at the source end.

In addition, the AP 1 device may determine the information such as the IP address and MAC of the terminal that accesses the AP 1 device, and the AP 1 device may generate corresponding routing information based on the IP address of the AP 1 device and the information such as the IP address and MAC of the terminal that accesses the AP 1 device.

In addition, the AP 1 device may further periodically detect the IP network reachability of the peer device of the VXLAN tunnel, and when discovering that the peer device of the VXLAN tunnel is in a state in which an IP network is unreachable, switch, to an alternate VXLAN tunnel in a timely manner, uplink traffic of the terminal through the AP 1 device, generate tunnel status indication information, and send the tunnel status indication information to the AC device, so that the AC device generates an alarm or performs subsequent processing.

64: When the AP 1 device serves as an authentication point of the station, after the station is authenticated or goes online, the AP 1 device sends related information of the station to the AC device by using a CAPWAP control session message in Add-Station to carry the related information, so that the AC device locally generates a host routing entry of the station, where a next hop of the host routing entry points to the AP 1 device through the VXLAN tunnel.

The related information of the terminal includes, but is not limited to, the IP address of the terminal, or the IP address and the MAC address of the terminal.

After the station goes offline or roams to another AP device, the AC device deletes or updates the host routing entry of the station based on a message sent by the AP 1 device.

65: The AP 1 device receives an 802.11 data packet of the station (e.g., a terminal) through a radio frequency port of an SSID; converts the 802.11 data packet into an 802.3 ethernet frame; searches a MAC forwarding table based on source MAC in the 802.3 ethernet frame, or a routing table; determines that the 802.11 data packet is a data packet to be sent to the AC device; encapsulates the 802.3 ethernet frame with a corresponding VXLAN tunnel header, to obtain a VXLAN packet; and forwards the VXLAN packet.

The 802.11 data packet includes destination MAC and source MAC. The 802.11 data packet is converted into the 802.3 ethernet frame. Whether the source MAC in the 802.3 ethernet frame is local MAC is checked. If the source MAC is not local MAC, the MAC forwarding table is searched, to determine that the 802.11 data packet is a data packet to be sent to the AC device; or if the source MAC in the 802.3 ethernet frame is local MAC, the routing table is searched, to determine that the 802.11 data packet is a data packet to be sent to the AC device.

66: The AC device receives the VXLAN packet sent by the AP 1 device in 65; decapsulates the VXLAN tunnel header of the VXLAN packet, to obtain the 802.3 ethernet frame obtained after VXLAN decapsulation; maps the 802.3 ethernet frame to a corresponding BD gateway based on the VNI in the VXLAN tunnel header; searches, for the MAC forwarding table based on the MAC in the 802.3 ethernet frame, a VPN routing pool in which the BD gateway is located, to determine whether the MAC is local MAC. If the MAC is the local MAC, the routing entry continues to be searched, to obtain forwarding information. Then, the 802.3 ethernet frame is modified based on the forwarding information, and the modified 802.3 ethernet frame is sent to an uplink routing device (for example, internet access traffic), or the modified 802.3 ethernet frame is re-encapsulated with the VXLAN tunnel header, and then sent to the AP device in which a destination station is located (for example, inter-station access traffic).

Modifying the 802.3 ethernet frame based on the forwarding information includes, but is not limited to, changing the source MAC in the 802.3 ethernet frame to MAC of the AC device, and changing the destination MAC in the 802.3 ethernet frame to MAC of a next hop indicated by the forwarding information. If the next hop indicated by the forwarding information obtained by searching the routing entry is an uplink routing device, the modified 802.3 ethernet frame is sent to the uplink routing device. If the next hop indicated by the forwarding information obtained by searching the routing entry is a new VXLAN tunnel, the modified 802.3 ethernet frame is encapsulated with the corresponding VXLAN tunnel header based on tunnel encapsulation information of the new VXLAN tunnel, to obtain a new VXLAN packet, and the new VXLAN packet is sent to an AP device in which the destination station is located.

In embodiments, the AC device may further receive the downlink packet of the station, search the host routing entry, encapsulate the VXLAN tunnel header based on the host routing entry, and send an encapsulated VXLAN packet to the AP device in which the destination station is located.

In embodiments, the AP 1 device may further receive, from an uplink port, a VXLAN packet sent by the AC device; perform VXLAN decapsulation; map the VXLAN packet to the corresponding BD gateway based on the VNI in the VXLAN header; search, for a route, the VPN routing pool in which the BD gateway is located, or search a MAC forwarding table (a forwarding table of the station), to obtain the forwarding information; modify, based on the forwarding information, the 802.3 ethernet frame obtained after VXLAN decapsulation; and convert the modified 802.3 ethernet frame into the 802.11 data packet, and send the 802.11 data packet to the station through a corresponding radio frequency port.

Figure 7:
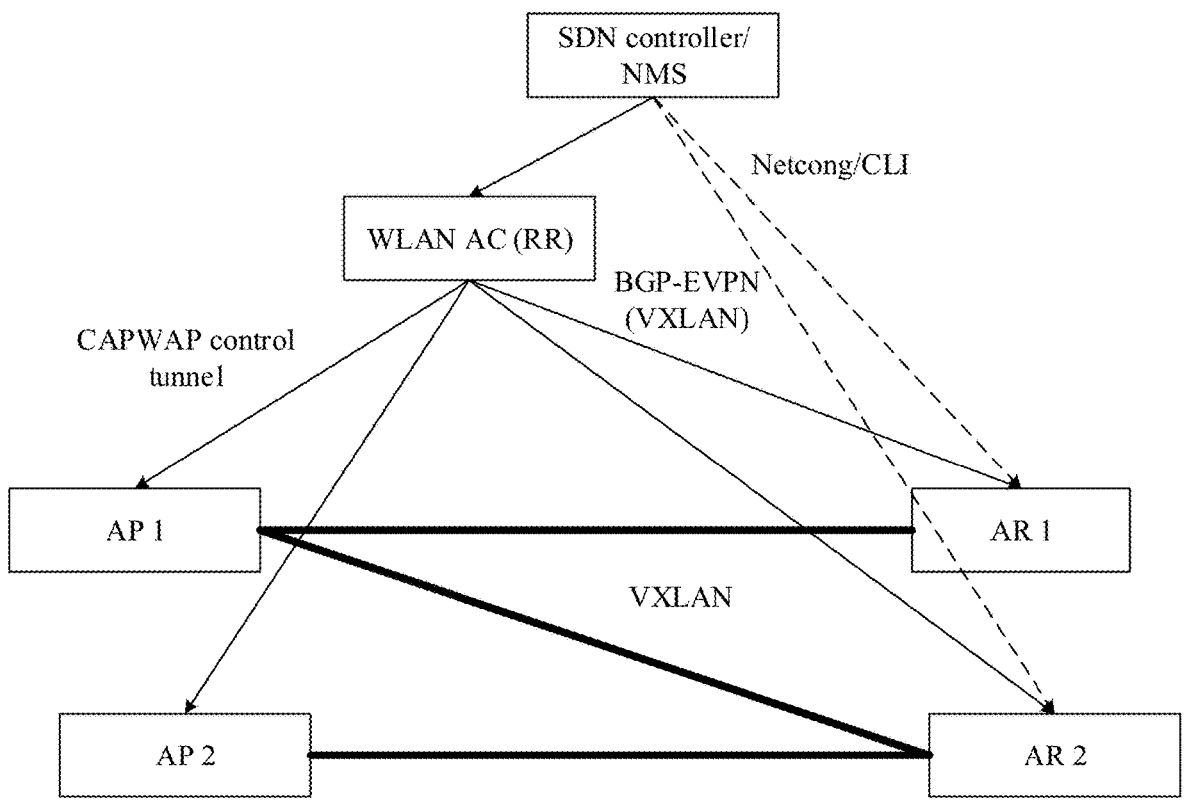
FIG. 7 is a schematic diagram of a structure of a communication system according to another embodiment of this application.

A system shown in FIG. 7 is used as an example, a WLAN AC device and an AR device (an AR 1 and an AR 2 in FIG. 7) may be two independent and separated devices, and the AC device serves as an RR, and exchanges an L2/3 route with the AR device by using BGP-EVPN-VXLAN. The AC device mainly generates a host routing entry and MAC routing information based on station information sent by an AP device, and disseminates L2 and/or L3 routing information (which carry/carries VXLAN tunnel information) to the corresponding AR device. The AR device may be a switch device having an L3 routing function. In the embodiment shown in FIG. 7, for ease of subsequent description, the WLAN AC (e.g., the RR) is referred to as an AC device for short, and that an AP 1 device in the AP 1 and an AP 2 interacts with the AC device to implement a tunnel configuration method is used as an example for description. For example, the AP 1 device sends a data tunnel support capability of the AP 1 device to the AC device, and indicates, based on the data tunnel support capability, that a type of at least one data tunnel supported by the AP 1 device includes a VXLAN. The AC device configures that the AP 1 device uses the VXLAN as a data tunnel, and specifies a group of AR devices (there is at least one AR device; and if there are a plurality of AR devices, an active-backup or load balancing policy may be configured). As shown in FIG. 7, the AR 1 and the AR 2 are used as an example. The AR 1 device and the AR 2 device serve as VXLAN egress gateways, and in a VXLAN network including the AP 1 device and the AC device, the AR 1 device and the AR 2 device may be configured as centralized gateways, or may be configured as distributed gateways. The AP 1 device may serve as a gateway of a local L3 route, and a default route or a policy route matching an ingress VLAN is configured. A next hop points to a VXLAN egress gateway. In the system shown in FIG. 7, a tunnel configuration method includes the following interaction processing process.

71: The AP 1 device discovers the AC device in a manner such as a CAPWAP discovery mechanism, and actively sets up a CAPWAP control session with the AC device.

In the method provided in these embodiments of this application, a network management person uses an SDN controller, a network management system, or a WEB UI or a CLI interface built in the AC device to configure, for the AC device, that a type of a data tunnel used by the AP 1 device is a VXLAN. An IP address of a peer device of a VXLAN tunnel is an IP address of a specified AR device. This may include at least one AR device, where if there are a plurality of AR devices, the plurality of AR devices may be configured to use an active-backup or load balancing backup policy. For example, the AR 1 device and the AR 2 device in FIG. 7, a tunnel between the AR 1 device and the AP 1 device may be used as an active tunnel, and a tunnel between the AR 2 device and the AP 1 device serves as an alternate tunnel. The network management person may configure, based on an AP 1 device group, that the type of the data tunnel is a VXLAN, specify that the IP address of the peer device of the VXLAN tunnel is the IP address of the AR device, and then configure VNI information. The VNI information includes a VNI or a VNI mapping relationship. The VNI mapping relationship includes at least one of a mapping relationship between an SSID and a VNI, a mapping relationship between an AP VLAN and a VNI, and a mapping relationship between a VLAN pool and a VNI. For example, the network management person may configure, based on the SSID, that the type of the data tunnel is a VXLAN, specify a VNI to which the SSID is mapped, and specify that the IP address of the peer device of the VXLAN tunnel is the IP address of the AR device; or may directly configure a VNI to which a VLAN or a VLAN pool used by the AP 1 device is mapped, and configure that the IP address of the peer device of the VXLAN tunnel is the IP address of the AR device.

72: The AC device sends the VNI mapping relationship and the IP address of the peer AR device of the VXLAN tunnel to the AP 1 device based on configuration.

The VNI mapping relationship includes at least one of a mapping relationship between an SSID and a VNI, a mapping relationship between a VLAN and a VNI, and a mapping relationship between a VLAN pool and a VNI. A manner of sending configuration information such as the VNI mapping relationship and the IP address of the peer AR device of the VXLAN tunnel is not limited to these embodiments of this application. For example, the AC device uses an extended CAPWAP WLAN configuration request to carry the VNI mapping relationship and the IP address of the peer AR device of the VXLAN tunnel, and sends the VNI mapping relationship and the IP address of the peer AR device of the VXLAN tunnel to the AP 1 device by using the extended CAPWAP configuration request.

For example, in the system shown in FIG. 7, the VXLAN tunnel is a tunnel between the AP 1 device and the AR device. For the AP 1 device, a local end of the VXLAN tunnel is the AP 1 device, and a peer device of the VXLAN tunnel is the AR device, including the AR 1 device and the AR 2 device. Therefore, the IP address of the peer device of the VXLAN tunnel is an IP address of the AR 1 device and an IP address of the AR 2 device.

In embodiments, the AP device includes a local forwarding mode and a centralized forwarding mode. In the centralized forwarding mode, the AP device does not serve as an authentication point. All information is authenticated and forwarded by the AC device. In the local forwarding mode, the AP device may serve as an authentication point, and the AP device performs authentication and forwarding. In these embodiments of this application, because the AC device sends the configuration information of the VXLAN tunnel to the AP 1 device, after the AP 1 device implements tunnel configuration based on the configuration information of the VXLAN tunnel, local forwarding can be implemented. Therefore, the AC device may set the AP 1 device to the local forwarding mode.

73: The AP 1 device generates tunnel encapsulation information and routing information based on the IP address of the peer device of the VXLAN tunnel and the VNI mapping relationship that are sent by the AC device.

For example, the configuration information that is of the VXLAN tunnel and that is received by the AP 1 device includes the IP address of the peer device of the VXLAN tunnel. For the AP 1 device, the local device of the VXLAN tunnel is the AP 1 device, and the peer device of the VXLAN tunnel is the AC device. In other words, a destination end of the VXLAN tunnel is the AC device, and a source end is the AP 1 device. The AP 1 device may determine an SSID or a VLAN corresponding to a terminal that accesses the AP 1 device, and the VNI mapping relationship received by AP 1 includes at least one of the mapping relationship between an SSID and a VNI and the mapping relationship between a VLAN/VLAN pool and a VNI. Therefore, the AP 1 device may determine, based on the VNI mapping relationship, a VNI corresponding to the SSID or the VLAN of the terminal, and the AP 1 device can determine the tunnel encapsulation information of the VXLAN tunnel based on information such as the VNI, the IP of the AC device at the destination end, and the IP of the AP 1 device at the source end.

In addition, the AP 1 device may determine information such as an IP and MAC of the terminal that accesses the AP 1 device, and the AP 1 device may generate corresponding routing information based on the IP of the AP 1 device and the information such as the IP and MAC of the terminal that accesses the AP 1 device.

For example, the AC device may further send a default route to the AP device based on a requirement, and a next hop of the default route points to the VXLAN tunnel, so that the AP device can forward, based on the default route, a received packet to the AR device through the VXLAN tunnel.

In addition, the AP 1 device may further periodically detect IP network reachability of the peer AR device of the VXLAN tunnel, and when discovering that the peer device of the VXLAN tunnel is in a state in which an IP network is unreachable, switch to an alternate VXLAN tunnel in a timely manner. The API device may then uplink traffic of the terminal through the AP 1 device, generate tunnel status indication information, and send the tunnel status indication information to the AC device, so that the AC device generates an alarm or performs subsequent processing.

74: When the AP 1 device serves as an authentication point of the station, after the station is authenticated or goes online, the AP 1 device sends related information of the station to the AC device by using a CAPWAP control session message in Add-Station to carry the related information, so that the AC device locally generates a host routing entry of the station, where a next hop of the host routing entry points to the AP 1 device through the VXLAN tunnel.

The related information of the station includes but is not limited to an IP address of the station, or an IP address and a MAC address of the station.

75: The AC device generates the host routing entry and the MAC routing information based on the related information of the station and that is sent by the AP 1 device, and disseminates the L2 and/or L3 routing information (which carry/carries the VXLAN tunnel encapsulation information) to the corresponding AR device. In this way, when flooding of an unknown unicast packet and an address resolution protocol (ARP) packet is limited on the AP 1 device, the corresponding AR device learns, from a control plane, routing information of a corresponding station that uses the AR device as an egress gateway.

In embodiments, after the station is offline or roams to another AP, the AC device deletes or updates a host routing entry of the station based on a message sent by the AP 1 device. The AC device disseminates the L2/3 routing information (carrying VXLAN tunnel information) of the station to the corresponding AR device by using BGP-EVPN-VXLAN.

76: The AP 1 device receives an 802.11 data packet of a station (e.g., terminal) through a radio frequency port of an SSID; converts the 802.11 data packet into an 802.3 ethernet frame; searches a MAC forwarding table based on source MAC in the 802.3 ethernet frame, or a routing table; determines that the 802.11 data packet is a data packet to be sent to the AR device; encapsulates the 802.3 ethernet frame with a corresponding VXLAN tunnel header; and forwards the 802.3 ethernet frame.

The 802.11 data packet includes destination MAC and source MAC. The 802.11 data packet is converted into the 802.3 ethernet frame. Whether the source MAC in the 802.3 ethernet frame is local MAC is checked. If the source MAC is not local MAC, the MAC forwarding table is searched, to determine that the 802.11 data packet is a data packet to be sent to the AR device; or if the source MAC in the 802.3 ethernet frame is local MAC, the routing table is searched, to determine that the 802.11 data packet is a data packet to be sent to the AR device.

77: The AR 1 device receives a VXLAN packet sent by the AP 1 device in 76; decapsulates the VXLAN tunnel header of the VXLAN packet, to obtain the 802.3 ethernet frame obtained after VXLAN decapsulation; maps the VXLAN packet to a corresponding BD gateway based on a VNI in the VXLAN tunnel header; searches, for a route, a VPN routing pool in which the BD gateway is located, or searches a MAC forwarding table, to obtain forwarding information; and modifies, based on the forwarding information, the 802.3 ethernet frame obtained after VXLAN decapsulation, and sends the modified 802.3 ethernet frame to an uplink routing device (for example, internet access traffic); or re-encapsulates the modified 802.3 ethernet frame with a VXLAN tunnel header, and then sends the re-encapsulated 802.3 ethernet frame to the AP device in which a destination station is located (for example, inter-station access traffic).

Modifying the 802.3 ethernet frame based on the forwarding information includes, but is not limited to, changing the source MAC in the 802.3 ethernet frame to MAC of the AR 1 device, and changing the destination MAC in the 802.3 ethernet frame to MAC of a next hop indicated by the forwarding information. If the next hop indicated by the forwarding information obtained by searching the routing entry is an uplink routing device, the modified 802.3 ethernet frame is sent to the uplink routing device. If the next hop indicated by the forwarding information obtained by searching the routing entry is a new VXLAN tunnel, the modified 802.3 ethernet frame is encapsulated with the corresponding VXLAN tunnel header based on tunnel encapsulation information of the new VXLAN tunnel, to obtain a new VXLAN packet, and the new VXLAN packet is sent to an AP device in which the destination station is located.

In embodiments, the AR 1 device may further receive the downlink packet of the station, search the host routing entry, encapsulate the VXLAN tunnel header based on the host routing entry, and send the encapsulated VXLAN packet to the AP device in which the destination station is located.

In embodiments, the AP 1 device may further receive, from an uplink port, the VXLAN packet sent by the AR 1 device; perform VXLAN decapsulation; map the VXLAN packet to the corresponding BD gateway based on the VNI in the VXLAN header; search, for the MAC forwarding table (a forwarding table of the station), the VPN routing pool in which the BD gateway is located; when determining if the MAC is local MAC, continue to search the routing forwarding table, to obtain the forwarding information; modify, based on the forwarding information, the 802.3 ethernet frame obtained after VXLAN decapsulation; and convert the modified 802.3 ethernet frame into an 802.11 data packet, and send the 802.11 data packet to the station through a corresponding radio frequency port.

Figure 8:
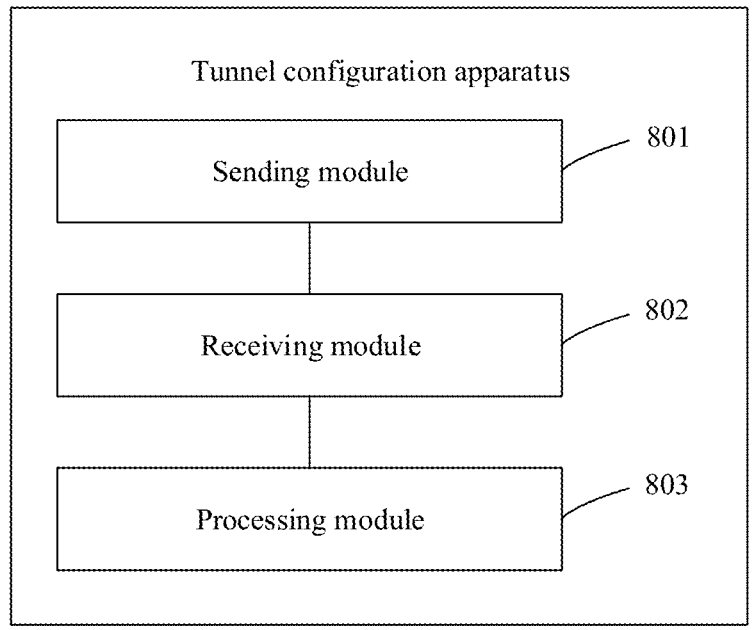
FIG. 8 is a schematic diagram of a structure of a tunnel configuration apparatus according to an embodiment of this application.

As shown in FIG. 8, an embodiment of this application provides a tunnel configuration apparatus. The apparatus is used in an AP device. The AP device is the AP device illustrated in FIG. 5. FIG. 6, and FIG. 7. Based on the following plurality of modules shown in FIG. 8, the tunnel configuration apparatus shown in FIG. 8 can perform all or some operations performed by the AP device. The modules are as follows.

A sending module 801 is configured to send a data tunnel support capability of the AP device to an AC device. The data tunnel support capability is used to indicate a type of at least one data tunnel supported by the AP device, and the type of the at least one data tunnel includes a virtual extensible local area network VXLAN.

A receiving module 802 is configured to receive configuration information of a VXLAN tunnel sent by the AC device. A local device of the VXLAN tunnel is the AP device, and the configuration information of the VXLAN tunnel includes an IP address of at least one peer device of the VXLAN tunnel and VNI information of the VXLAN tunnel.

A processing module 803 is configured to generate tunnel encapsulation information and routing information based on the IP address of the at least one peer device of the VXLAN tunnel and the VNI information. The tunnel encapsulation information includes an IP address of the AP device, the IP address of the at least one peer device of the VXLAN tunnel, and a VNI.

In embodiments, the apparatus further includes: a detection module, configured to detect IP network reachability of a peer device of a first VXLAN tunnel, where the first VXLAN tunnel belongs to at least one VXLAN tunnel. Each local device of the at least one VXLAN tunnel is the AP device, and a peer device of the at least one VXLAN tunnel is respectively the at least one peer device.

The sending module 801 is further configured to: send first tunnel status indication information to the AC device when it is detected that the peer device of the first VXLAN tunnel is in a state in which an IP network is unreachable, where the first tunnel status indication information is used to indicate that a tunnel status is an unreachable state; or send second tunnel status indication information to the AC device when it is detected that the peer device of the first VXLAN tunnel is restored from a state in which an IP network is unreachable to a state in which an IP network is reachable, where the second tunnel status indication information is used to indicate that the tunnel status is a reachable state.

In embodiments, the processing module 803 is further configured to switch, based on a configured VXLAN tunnel backup relationship and a configured VXLAN tunnel backup policy to an alternate VXLAN tunnel corresponding to the first VXLAN tunnel, uplink traffic forwarded by a terminal through the AP device.

In embodiments, the processing module 803 is further configured to: after it is detected that the peer device of the first VXLAN tunnel is restored from the state in which an IP network is unreachable to the state in which an IP network is reachable, determine, based on a configured tunnel switchback policy, whether to switch the uplink traffic back to the first VXLAN tunnel.

In embodiments, the sending module 801 is further configured to: when the AP device serves as an authentication point of the terminal, after the terminal is authenticated or goes online, send related information of the terminal to the AC device. The related information of the terminal is used by the AC device to generate a host routing entry of the terminal, and a next hop of the host routing entry points to the AP device through the VXLAN tunnel.

In embodiments, the VNI information includes a VNI or a VNI mapping relationship, and the VNI mapping relationship includes at least one of a mapping relationship between a SSID and a VNI, a mapping relationship between a VLAN and a VNI, and a mapping relationship between a VLAN pool and a VNI.

In embodiments, the sending module 801 is configured to send an extended CAPWAP join request to the AC device. The CAPWAP join request carries information about the type of the at least one data tunnel supported by the AP device.

The receiving module 802 is configured to receive a CAPWAP WLAN configuration request sent by the AC device. The CAPWAP WLAN configuration request carries the configuration information of the VXLAN tunnel.

In embodiments, the configuration information of the VXLAN tunnel further includes at least one of the VXLAN tunnel backup policy and the switchback policy, the VXLAN tunnel backup policy is used to indicate the VXLAN tunnel backup relationship, and the switchback policy is used to indicate whether to perform switchback after tunnel restoration.

In embodiments, the sending module 801 is configured to send a first WTP event request to the AC device. The first WTP event request carries the first tunnel status indication information.

The sending module 801 is configured to send a second WTP event request to the AC device. The second WTP event request carries the second tunnel status indication information.

In embodiments, the first tunnel status indication information includes: a service mode, a VLAN identifier or WLAN ID information, an IP address of a peer device of a tunnel, and a first tunnel status field, and a value of the first tunnel status field is used to indicate that the tunnel status is an unreachable state; the second tunnel status indication information includes: a service mode, a VLAN identifier or WLAN ID information, an IP address of a peer device of a tunnel, and a second tunnel status field, and a value of the second tunnel status field is used to indicate that the tunnel status is a reachable state; and the service mode, the VLAN identifier or the WLAN ID information, and the IP address of a peer device of a tunnel are used to identify a VXLAN tunnel.

Figure 9:
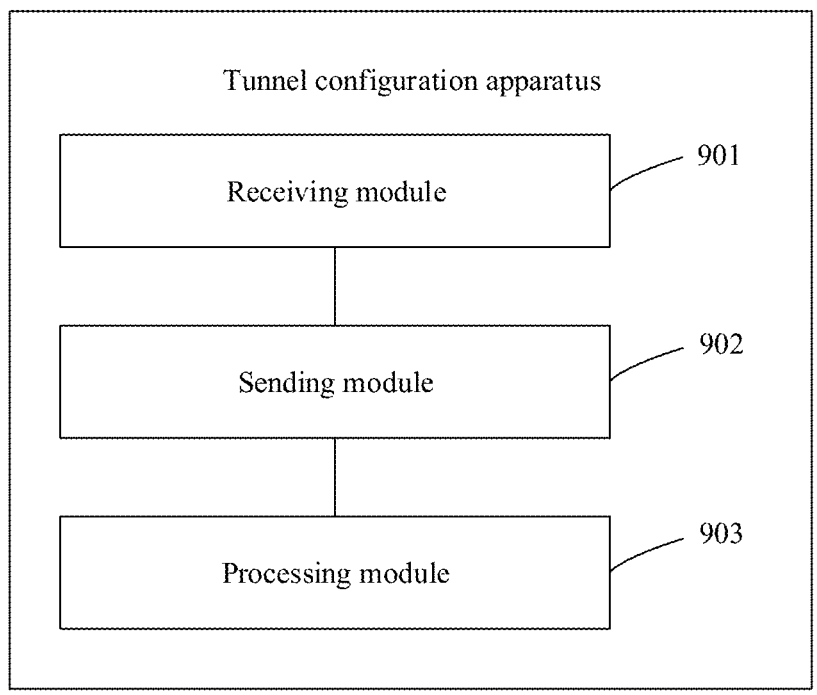
FIG. 9 is a schematic diagram of a structure of a tunnel configuration apparatus according to another embodiment of this application.

Refer to FIG. 9. An embodiment of this application provides a tunnel configuration apparatus. The apparatus is used in an AC device. The AC device is an AC device illustrated in FIG. 5. FIG. 6, and FIG. 7. Based on the following plurality of modules shown in FIG. 9, the tunnel configuration apparatus shown in FIG. 9 can perform all or some operations performed by the AC device. The modules are as follows.

A receiving module 901 is configured to receive a data tunnel support capability that is of an AP device and that is sent by the AP device. The data tunnel support capability is used to indicate a type of at least one data tunnel supported by the AP device, and the type of the at least one data tunnel includes a VXLAN.

A sending module 902 is configured to send configuration information of a VXLAN tunnel to the AP device based on the data tunnel support capability of the AP device. The configuration information of the VXLAN tunnel includes an IP address of at least one peer device of the VXLAN tunnel and VNI information of the VXLAN tunnel.

A processing module 903 is configured to generate a routing table based on the IP address of the at least one peer device of the VXLAN tunnel.

In embodiments, the receiving module 901 is further configured to: receive first tunnel status indication information sent by the AP device, where the first tunnel status indication information is used to indicate that a tunnel status is an unreachable state; or receive second tunnel status indication information sent by the AP device, where the second tunnel status indication information is used to indicate that a tunnel status is a reachable state.

In embodiments, the receiving module 901 is further configured to receive related information of a terminal and is sent by the AP device when the AP device serves as an authentication point of the terminal.

The processing module 903 is further configured to generate a host routing entry of the terminal based on the related information of the terminal. A next hop of the host routing entry points to the AP device through the VXLAN tunnel.

In embodiments, the processing module 903 is further configured to: delete the host routing entry of the terminal after the terminal goes offline; or update the host routing entry of the terminal after the terminal roams to another AP device.

In embodiments, the sending module 902 is further configured to disseminate L2/3 routing information of the terminal to a corresponding AR device. The L2/3 routing information of the terminal carries VXLAN tunnel information.

In embodiments, the VNI information includes a VNI or a VNI mapping relationship, and the VNI mapping relationship includes at least one of a mapping relationship between a SSID and a VNI, a mapping relationship between a VLAN and a VNI, and a mapping relationship between a VLAN pool and a VNI.

In embodiments, the receiving module 901 is configured to receive an extended CAPWAP join request sent by the AP device. The CAPWAP join request carries information about a type of at least one data tunnel supported by the AP device.

The sending module 902 is configured to send a CAPWAP WLAN configuration request to the AP device based on the data tunnel support capability of the AP device. The CAPWAP WLAN configuration request carries the configuration information of the VXLAN tunnel.

In embodiments, the configuration information of the VXLAN tunnel further includes at least one of a VXLAN tunnel backup policy and a switchback policy, the VXLAN tunnel backup policy is used to indicate a VXLAN tunnel backup relationship, and the switchback policy is used to indicate whether to perform switchback after tunnel restoration.

In embodiments, the receiving module 901 is configured to receive a first WTP event request sent by the AP device. The first WTP event request carries the first tunnel status indication information.

The receiving module is configured to receive a second WTP event request sent by the AP device. The second WTP event request carries the second tunnel status indication information.

In embodiments, the first tunnel status indication information includes: a service mode, a VLAN identifier or WLAN ID information, an IP address of a peer device of a tunnel, and a first tunnel status field, and a value of the first tunnel status field is used to indicate that the tunnel status is an unreachable state; the second tunnel status indication information includes: a service mode, a VLAN identifier or WLAN ID information, an IP address of a peer device of a tunnel, and a second tunnel status field, and a value of the second tunnel status field is used to indicate that the tunnel status is a reachable state; and the service mode, the VLAN identifier or the WLAN ID information, and the IP address of a peer device of a tunnel are used to identify a VXLAN tunnel.

It should be understood that, when the apparatuses provided in FIG. 8 and FIG. 9 implement functions of the apparatuses, division of the foregoing functional modules is merely used as an example for description. In actual application, the foregoing functions may be allocated to different functional modules for implementation based on a requirement, in other words, an internal structure of a device is divided into different functional modules, to implement all or some of the functions described above. In addition, the apparatus provided in the foregoing embodiments and the method embodiments are based on a same concept. For an example process, refer to the method embodiments, and details are not described herein again.

Figure 10:
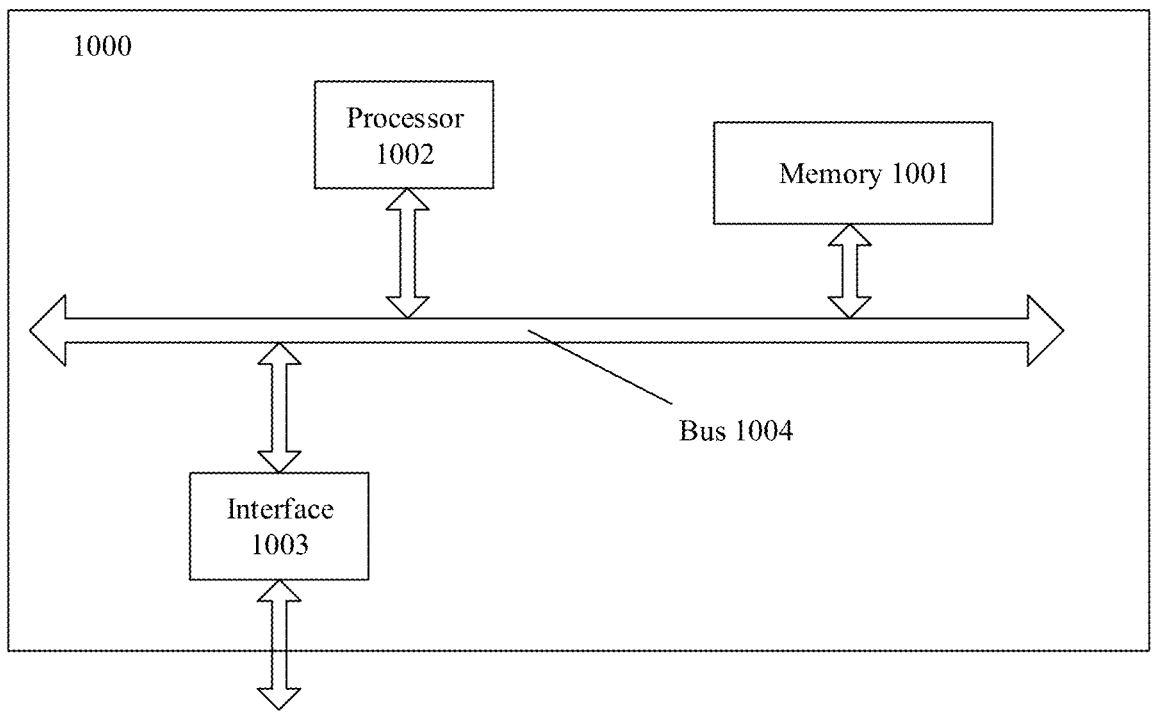
FIG. 10 is a schematic diagram of a structure of a tunnel configuration device according to an embodiment of this application.

Refer to FIG. 10. An embodiment of this application further provides a tunnel configuration device 1000. The tunnel configuration device 1000 shown in FIG. 10 is configured to perform an operation in the foregoing tunnel configuration method. The tunnel configuration device 1000 includes a memory 1001, a processor 1002, and an interface 1003, and the memory 1001, the processor 1002, and the interface 1003 are connected through a bus 1004.

The memory 1001 stores at least one instruction, and the at least one instruction is loaded and executed by the processor 1002, to implement any one of the foregoing tunnel configuration methods.

The interface 1003 is configured to communicate with another device in a network. The interface 1003 may implement communication in a wireless or wired manner. For example, the interface 1003 may be a network adapter. For example, the tunnel configuration device 1000 may communicate with a server through the interface 1003.

For example, the network device shown in FIG. 10 is the AP device illustrated in in FIG. 5, FIG. 6, and FIG. 7, and the processor 1002 reads the instruction in the memory 1001, so that the network device shown in FIG. 10 can perform all or some operations performed by the AP device.

For another example, the network device shown in FIG. 10 is the AC device illustrated in FIG. 5, FIG. 6, and FIG. 7, the processor 1002 reads the instruction in the memory 1001, so that the network device shown in FIG. 10 can perform all or some operations performed by the AC device.

It can be understood that FIG. 10 shows merely a simplified design of the tunnel configuration device 1000. During actual application, the tunnel configuration device may include any quantity of interfaces, processors, or memories. In addition, the processor may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing machines (advanced RISC machines, ARM) architecture.

Further, in an optional embodiment, the foregoing memory may include a read-only memory (ROM) and a random access memory (RAM), and provide instructions and data for the processor. The memory may further include a nonvolatile random access memory. For example, the memory may further store information about a device type.

The memory may be a volatile memory or a nonvolatile memory, or may include both a volatile memory and a nonvolatile memory. The nonvolatile memory may be a read-only memory, a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A tunnel configuration system is further provided. The system includes an AP device, an AC device, and an AR device. In embodiments, the AR device and the AC device are a combined device, or the AR device and the AC device are independent and separated devices. The AP device is configured to perform the method performed by the AP device in the foregoing tunnel configuration method, and the AC device is configured to perform the method performed by the AC device in the foregoing tunnel configuration method.

A tunnel configuration device is further provided. The device includes a memory and a processor, the memory stores at least one instruction, and the at least one instruction is loaded and executed by the processor, to implement any one of the foregoing tunnel configuration methods.

A computer-readable storage medium is further provided. The storage medium stores at least one instruction, and a processor loads and executes the instruction to implement any one of the foregoing tunnel configuration methods.

A communication apparatus is further provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive and send a signal. In addition, when the processor executes the instructions stored in the memory, the processor is enabled to perform the method in any one of the foregoing possible implementations.

In embodiments, there are one or more processors, and there are one or more memories.

In embodiments, the memory may be integrated with the processor, or the memory and the processor are disposed separately.

In an embodiment process, the memory may be a non-transitory memory, for example, a read-only memory. The memory and the processor may be integrated into one chip, or may be disposed in different chips. A type of the memory and a manner of disposing the memory and the processor are not limited in these embodiments of this application.

A computer program (product) is provided. The computer program includes computer program code. When the computer program code is run on a computer, the computer is enabled to perform the methods in the foregoing aspects.

A chip is provided. The chip includes a processor, configured to invoke and run instructions stored in a memory, so that a communication device on which the chip is installed performs the methods in the foregoing aspects.

Another chip is provided, and includes an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

This application provides a computer program. When the computer program is executed by a computer, the processor or the computer may be enabled to perform corresponding operations and/or procedures in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or the functions according to this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely the embodiments of this application, but are not intended to limit this application. Any modification, equivalent replacement, or improvement made without departing from the principle of this application shall fall within the protection scope of this application.

What is claimed is:

1. A tunnel configuration method, wherein the method comprises:
    sending, by an access point (AP) device, a data tunnel support capability of the AP device to an access point controller (AC) device, wherein the data tunnel support capability is used to indicate a type of at least one data tunnel supported by the AP device, and the type of the at least one data tunnel comprises a virtual extensible local area network (VXLAN);
    receiving, by the AP device, configuration information of at least one VXLAN tunnel sent by the AC device, wherein at least one local device of the at least one VXLAN tunnel is the AP device, and the configuration information of the at least one VXLAN tunnel comprises an internet protocol (IP) address of at least one peer device of the at least one VXLAN tunnel and virtual network index (VNI) information of the at least one VXLAN tunnel; and
    generating, by the AP device, tunnel encapsulation information and routing information based on the IP address of the at least one peer device of the at least one VXLAN tunnel and the VNI information, wherein the tunnel encapsulation information comprises an IP address of the AP device, the IP address of the at least one peer device of the at least one VXLAN tunnel, and a VNI.

2. The method according to claim 1, wherein after setting up the at least one VXLAN tunnel, the method further comprises:
    detecting, by the AP device, IP network reachability of a peer device of a first VXLAN tunnel, wherein the first VXLAN tunnel belongs to the at least one VXLAN tunnel, each of the at least one local device of the at least one VXLAN tunnel is the AP device, and the peer device of the at least one VXLAN tunnel belongs to the at least one peer device; and
    sending first tunnel status indication information to the AC device when detecting that the peer device of the first VXLAN tunnel is in a state in which an IP network is unreachable, wherein the first tunnel status indication information is used to indicate that a tunnel status is in an unreachable state; or sending second tunnel status indication information to the AC device when detecting that the peer device of the first VXLAN tunnel is restored from a state in which the IP network is unreachable to a state in which the IP network is reachable, wherein the second tunnel status indication information is used to indicate that the tunnel status is in a reachable state.

3. The method according to claim 2, wherein when it is detected that the peer device of the first VXLAN tunnel is in the state in which the IP network is unreachable, the method further comprises:

switching, based on a configured VXLAN tunnel backup relationship and a configured VXLAN tunnel backup policy to an alternate VXLAN tunnel of the at least one VXLAN tunnel corresponding to the first VXLAN tunnel, uplink traffic forwarded by a terminal through the AP device.

4. The method according to claim 1, wherein the method further comprises:

when the AP device serves as an authentication point of a terminal, after the terminal is authenticated or goes online, sending related information of the terminal to the AC device, wherein the related information of the terminal is used by the AC device to generate a host routing entry of the terminal, and a next hop of the host routing entry points to the AP device through the at least one VXLAN tunnel.

5. The method according to claim 1, wherein the VNI information comprises the VNI or a VNI mapping relationship, the VNI mapping relationship is used to obtain the VNI, and the VNI mapping relationship comprises at least one of a mapping relationship between a service set identifier (SSID) and the VNI, a mapping relationship between a virtual local area network (VLAN) and the VNI, or a mapping relationship between a VLAN pool or the VNI.

6. The method according to claim 1, wherein the sending, by the AP device, the data tunnel support capability of the AP device to the AC device comprises:

sending, by the AP device, an extended control and provisioning of wireless access points (CAPWAP) join request to the AC device, wherein the CAPWAP join request carries information about the type of the at least one data tunnel supported by the AP device; and the receiving, by the AP device, configuration information of the at least one VXLAN tunnel sent by the AC device comprises:

receiving, by the AP device, a CAPWAP wireless local area network (WLAN) configuration request sent by the AC device, wherein the CAPWAP WLAN configuration request carries the configuration information of the at least one VXLAN tunnel.

7. The method according to claim 1, wherein the configuration information of the at least one VXLAN tunnel further comprises at least one of the VXLAN tunnel backup policy or the switchback policy, the VXLAN tunnel backup policy is used to indicate the VXLAN tunnel backup relationship, and the switchback policy is used to indicate whether to perform switchback after tunnel restoration.

8. The method according to claim 2, wherein the sending of the first tunnel status indication information to the AC device comprises:

sending, by the AP device, a first wireless transaction protocol (WTP) event request to the AC device, wherein the WTP event request carries the first tunnel status indication information; and the sending of the second tunnel status indication information to the AC device comprises:

sending, by the AP device, a second WTP event request to the AC device, wherein the second WTP event request carries the second tunnel status indication information.

9. The method according to claim 2, wherein the first tunnel status indication information comprises: a service mode, a virtual local area network (VLAN) identifier or wireless local area network (WLAN) ID information, an IP address of a peer device of a tunnel, and a first tunnel status field, and a value of the first tunnel status field is used to indicate that the tunnel status is in an unreachable state;

the second tunnel status indication information comprises: the service mode, the VLAN identifier or the WLAN ID information, the IP address of a peer device of the tunnel, and a second tunnel status field, and a value of the second tunnel status field is used to indicate that the tunnel status is in the reachable state; and the service mode, the VLAN identifier or the WLAN ID information, and the IP address of a peer device of a tunnel are used to identify a VXLAN tunnel of the at least one VXLAN tunnel.

10. A tunnel configuration apparatus, wherein the apparatus is used in an access point (AP) device and comprises:

at least one processor;

one or more memories coupled to the at least one processor and storing instruction which when executed by the at least one processor, cause the apparatus to:

send a data tunnel support capability of the AP device to an access point controller (AC) device, wherein the data tunnel support capability is used to indicate a type of at least one data tunnel supported by the AP device, and the type of the at least one data tunnel comprises a virtual extensible local area network (VXLAN);

receive configuration information of at least one VXLAN tunnel sent by the AC device, wherein at least one local device of the at least one VXLAN tunnel is the AP device, and the configuration information of the at least one VXLAN tunnel comprises an internet protocol (IP) address of at least one peer device of the at least one VXLAN tunnel and virtual network index (VNI) information of the at least one VXLAN tunnel; and generate tunnel encapsulation information and routing information based on the IP address of the at least one peer device of the at least one VXLAN tunnel and the VNI information, wherein the tunnel encapsulation information comprises an IP address of the AP device, the IP address of the at least one peer device of the at least one VXLAN tunnel, and a VNI.

11. The apparatus according to claim 10, wherein the instructions executed by the at least one processor further cause the apparatus to:

detect IP network reachability of a peer device of a first VXLAN tunnel, wherein the first VXLAN tunnel belongs to the at least one VXLAN tunnel, each of the at least one local device of the at least one VXLAN tunnel is the AP device, and a peer device of the at least one VXLAN tunnel respectively belongs to the at least one peer device;

send first tunnel status indication information to the AC device when it is detected that the peer device of the first VXLAN tunnel is in a state in which an IP network is unreachable, wherein the first tunnel status indication information is used to indicate that a tunnel status is an unreachable state; or send second tunnel status indication information to the AC device when it is detected that the peer device of the first VXLAN tunnel is restored from a state in which the IP network is unreachable to a state in which the IP network is reachable, wherein the second tunnel status indication information is used to indicate that the tunnel status is in a reachable state.

12. The apparatus according to claim 11, wherein the instructions executed by the at least one processor further cause the apparatus to:
switch, based on a configured VXLAN tunnel backup relationship and a configured VXLAN tunnel backup policy to an alternate VXLAN tunnel of the at least one VXLAN tunnel corresponding to the first VXLAN tunnel, uplink traffic forwarded by a terminal through the AP device.

13. The apparatus according to claim 10, wherein the instructions executed by the at least one processor further cause the apparatus to:
when the AP device serves as an authentication point of a terminal, after the terminal is authenticated or goes online, send related information of the terminal to the AC device, wherein the related information of the terminal is used by the AC device to generate a host routing entry of the terminal, and a next hop of the host routing entry points to the AP device through the at least one VXLAN tunnel.

14. The apparatus according to claim 10, wherein the VNI information comprises the VNI or a VNI mapping relationship, the VNI mapping relationship is used to obtain the VNI, and the VNI mapping relationship comprises at least one of a mapping relationship between a service set identifier (SSID) and the VNI, a mapping relationship between a virtual local area network (VLAN) and the VNI, or a mapping relationship between a VLAN pool or the VNI.

15. The apparatus according to claim 10, wherein the instructions executed by the at least one processor further cause the apparatus to:
send an extended control and provisioning of wireless access points (CAPWAP) join request to the AC device, wherein the CAPWAP join request carries information about the type of the at least one data tunnel supported by the AP device; and
receive a CAPWAP wireless local area network (WLAN) configuration request sent by the AC device, wherein the CAPWAP WLAN configuration request carries the configuration information of the at least one VXLAN tunnel.

16. A non-transitory storage medium storing a program that is executable by one or more processors, the program including instructions for:
sending, by an access point (AP) device, a data tunnel support capability of the AP device to an access point controller (AC) device, wherein the data tunnel support capability is used to indicate a type of at least one data tunnel supported by the AP device, and the type of the at least one data tunnel comprises a virtual extensible local area network (VXLAN);
receiving, by the AP device, configuration information of at least one VXLAN tunnel is sent by the AC device, wherein at least one local device of the at least one VXLAN tunnel is the AP device, and the configuration information of the at least one VXLAN tunnel comprises an internet protocol (IP) address of at least one peer device of the at least one VXLAN tunnel and virtual network index (VNI) information of the at least one VXLAN tunnel; and
generating, by the AP device, tunnel encapsulation information and routing information based on the IP address of the at least one peer device of the at least one VXLAN tunnel and the VNI information, wherein the tunnel encapsulation information comprises an IP address of the AP device, the IP address of the at least one peer device of the at least one VXLAN tunnel, and a VNI.

17. The non-transitory storage medium according to claim 16, wherein the program is executable by one or more processors, the program including further instructions for:
detecting, by the AP device, IP network reachability of a peer device of a first VXLAN tunnel, wherein the first VXLAN tunnel belongs to the at least one VXLAN tunnel, each of the at least one local device of the at least one VXLAN tunnel is the AP device, and a peer device of the at least one VXLAN tunnel belongs to the at least one peer device; and
sending first tunnel status indication information to the AC device when detecting that the peer device of the first VXLAN tunnel is in a state in which an IP network is unreachable, wherein the first tunnel status indication information is used to indicate that a tunnel status is in an unreachable state; or
sending second tunnel status indication information to the AC device when detecting that the peer device of the first VXLAN tunnel is restored from a state in which the IP network is unreachable to a state in which the IP network is reachable, wherein the second tunnel status indication information is used to indicate that the tunnel status is in a reachable state.

18. The non-transitory storage medium according to claim 17, wherein when it is detected that the peer device of the first VXLAN tunnel is in the state in which the IP network is unreachable, the program is executable by one or more processors, the program including further instructions for:
switching, based on a configured VXLAN tunnel backup relationship and a configured VXLAN tunnel backup policy to an alternate VXLAN tunnel of the at least one VXLAN tunnel corresponding to the first VXLAN tunnel, uplink traffic forwarded by a terminal through the AP device.

19. The non-transitory storage medium according to claim 16, wherein the program is executable by one or more processors, the program including further instructions for:
when the AP device serves as an authentication point of a terminal sending related information of the terminal to the AC device, wherein the related information of the terminal is used by the AC device to generate a host routing entry of the terminal, and a next hop of the host routing entry points to the AP device through the at least one VXLAN tunnel.

20. The non-transitory storage medium according to claim 16, wherein the VNI information comprises the VNI or a VNI mapping relationship, the VNI mapping relationship is used to obtain the VNI, and the VNI mapping relationship comprises at least one of a mapping relationship between a service set identifier (SSID) and the VNI, a mapping relationship between a virtual local area network (VLAN) and the VNI, or a mapping relationship between a VLAN pool and the VNI.

* * * * *

UNITED STATES PATENT AND TRADEMARK OFFICE
CERTIFICATE OF CORRECTION

| | | |
|---|---|---|
| PATENT NO. | : 12,074,728 B2 | Page 1 of 1 |
| APPLICATION NO. | : 17/701882 | |
| DATED | : August 27, 2024 | |
| INVENTOR(S) | : Qiandeng Liang | |

It is certified that error appears in the above-identified patent and that said Letters Patent is hereby corrected as shown below:

In the Claims

In Column 41, Line 61, in Claim 16, after "tunnel" delete "is".

Signed and Sealed this
Twenty-ninth Day of October, 2024

Katherine Kelly Vidal
*Director of the United States Patent and Trademark Office*